United States Patent
Wehner et al.

[11] Patent Number: 5,925,696
[45] Date of Patent: Jul. 20, 1999

[54] STABILIZER COMBINATIONS FOR CHLORINE-CONTAINING POLYMERS

[75] Inventors: Wolfgang Wehner, Ober-Ramstadt; Hans-Helmut Friedrich, Lautertal; Kornelia Malzacher, Lindenfels; Hans-Ludwig Mehner, Lampertheim; Rolf Drewes, Worms, all of Germany

[73] Assignee: Ciba Speciality Chemicals Corporation, Tarrytown, N.Y.

[21] Appl. No.: 08/728,870

[22] Filed: Oct. 10, 1996

[30] Foreign Application Priority Data

Oct. 13, 1995 [CH] Switzerland .............................. 2912/95
Nov. 7, 1995 [CH] Switzerland .............................. 3151/95

[51] Int. Cl.$^6$ .............................. C08K 5/34; C08K 3/00
[52] U.S. Cl. .............................. 524/100; 524/424
[58] Field of Search .............................. 524/100, 424

[56] References Cited

U.S. PATENT DOCUMENTS

| | | | |
|---|---|---|---|
| 3,436,362 | 4/1969 | Hayer et al. .............................. | 524/100 |
| 4,352,903 | 10/1982 | Abeler .............................. | 529/100 |
| 4,656,209 | 4/1987 | Wehner et al. .............................. | 524/87 |
| 5,340,862 | 8/1994 | Silbermann et al. .............................. | 524/178 |

FOREIGN PATENT DOCUMENTS

| | | |
|---|---|---|
| 0041479 | 12/1981 | European Pat. Off. . |
| 0065934 | 12/1982 | European Pat. Off. . |
| 1694873 | 3/1973 | Germany . |

Primary Examiner—Kriellion S. Morgan
Attorney, Agent, or Firm—Luther A. R. Hall

[57] ABSTRACT

A stabilizer combination, mainly for PVC, is described, comprising

A) at least one compound of formula I

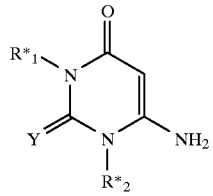

(I)

wherein $R^*_1$ and $R^*_2$ are each independently of the other $C_1$–$C_{12}$alkyl, $C_3$–$C_6$lkenyl, $C_5$–$C_8$cycloalkyl that is unsubstituted or substituted by from 1 to 3 $C_1$–$C_4$alkyl, $C_1$–$C_4$alkoxy, $C_5$–$C_8$cycloalkyl or by hydroxy groups or by chlorine atoms, or $C_7$–$C_9$phenylalkyl that is unsubstituted or substituted at the phenyl ring by from 1 to 3 $C_1$–$C_4$alkyl, $C_1$–$C_4$alkoxy, $C_5$–$C_8$cycloalkyl or by hydroxy groups or chlorine atoms, and $R^*_1$ and $R^*_2$ may additionally be hydrogen and $C_1$–$C_{12}$alkyl, and Y is S or O, and B) at least one compound from the following groups:
B1) perchlorate compounds,
B2) glycidyl compounds,
B3) beta-diketones and beta-keto esters,
B4) dihydropyridines and polydihydropyridines,
B5) polyols and disaccharide alcohols,
B6) sterically hindered amines (tetraalkylpiperidine compounds),
B7) alkali aluminosilicates (zeolites),
B8) hydrotalcites,
B9) alkali aluminocarbonates (dawsonites),
B10) alkali- (or alkaline earth-) carboxylates,-(bi)carbonates or -hydroxides,
B11) antioxidants and lubricants and
B12) organotin stabilizers.

12 Claims, No Drawings

STABILIZER COMBINATIONS FOR CHLORINE-CONTAINING POLYMERS

The invention relates to stabiliser combinations consisting of a compound of formula I shown below and at least one further substance from the following groups: the perchlorate compounds, glycidyl compounds, beta-diketones, beta-keto esters, dihydropyridines, polydihydropyridines, polyols, disaccharide alcohols, sterically hindered amines (tetraalkylpiperidine compounds), alkali aluminosilicates, hydrotalcites and alkali aluminocarbonates (dawsonites), alkali(or alkaline earth-) carboxylates,-(bi)carbonates oder -hydroxides, antioxidants, lubricants or organotin compounds which are suitable for stabilising chlorine-containing polymers, especially PVC.PVC can be stabilised by a number of additives. Compounds of lead, barium and cadmium are especially suitable for the purpose but are controversial today for ecological reasons or owing to their heavy metal content (cf. "Kunstoffadditive" (Plastics additives), R. Gächter/-H. Müller, Carl Hanser Verlag, 3$^{rd}$ Edition, 1989, pages 303–311, and "Kunststoff Handbuch PVC" (Plastics Handbook PVC), Volume 2/1, W. Becker/D. Braun, Carl Hanser Verlag, 2$^{nd}$ Edition, 1985, pages 531–538; and Kirk-Othmer: "Encyclopedia of Chemical Technology", 4$^{th}$ Ed., 1994, Vol 12, Heat Stabilizers p. 1071–1091). Other effective stabilisers and stabiliser combinations that are free of lead, barium and cadmium are therefore sought. Compounds of formula I have already been described in DE-PS 1 694 873, EP 65 934 and EP 41 479 and can be prepared in one or several process step(s) by known methods. It has now been found that A) compounds of formula I

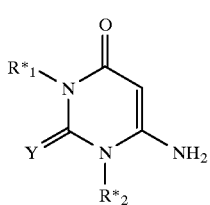

(I)

wherein $R^*_1$ and $R^*_2$ are each independently of the other $C_1$–$C_{12}$alkyl, $C_3$–$C_6$alkenyl, $C_5$–$C_8$cycloalkyl that is unsubstituted or substituted by from 1 to 3 $C_1$–$C_4$alkyl, $C_1$–$C_4$alkoxy, $C_5$–$C_8$cycloalkyl or hydroxy groups or chlorine atoms, or $C_7$–$C_9$phenylalkyl that is unsubstituted or substituted at the phenyl ring by from 1 to 3 $C_1$–$C_4$alkyl, $C_1$–$C_4$alkoxy, $C_5$–$C_8$cycloalkyl or hydroxy groups or chlorine atoms, and $R^*_1$ and $R^*_2$ may additionally be hydrogen and $C_1$–$C_{12}$alkyl, and Y is S or O, can be combined with B) at least one compound from the following group:

perchlorate compounds and/or glycidyl compounds and/or beta-diketones, beta-keto esters and/or dihydropyridines, polydihydropyridines and/or polyols, disaccharide alcohols and/or sterically hindered amines (tetraalkylpiperidine compounds) and/or alkali aluminosilicates (zeolites) and/or hydrotalcites and/or alkali aluminocarbonates (dawsonites) and/or, alkali- (or alkaline earth-) carboxylates,-(bi)carbonates oder -hydroxides, and/or antioxidants and lubricants and/or organotin compounds for the purpose of stabilising chlorine-containing polymers, especially PVC.

For compounds of formula I:

$C_1$–$C_4$Alkyl is, for example: methyl, ethyl, n-propyl, isopropyl, n-, iso-, sec- or tert-butyl.

$C_1$–$C_{12}$Alkyl is, for example, in addition to the radicals just mentioned, pentyl, hexyl, heptyl, octyl, 2-ethylhexyl, isooctyl, decyl, nonyl, undecyl or dodecyl.

$C_1$–$C_4$Alkoxy is, for example, methoxy, ethoxy, propoxy, isopropoxy, butoxy or isobutoxy.

$C_5$–$C_8$Cycloalkyl is, for example, cyclopentyl, cyclohexyl, cycloheptyl or cyclooctyl.

$C_7$–$C_9$Phenylalkyl is, for example, benzyl, 1- or 2-phenylethyl, 3-phenylpropyl, a,a-dimethylbenzyl or 2-phenylisopropyl, preferably benzyl.

When the cycloalkyl groups or the phenyl group of the phenylalkyl radicals are substituted, then they are substituted preferably by two or one substituent and, of the substituents, especially by Cl, hydroxy, methyl or methoxy.

$C_3$–$C_6$Alkenyl is, for example, vinyl, allyl, methallyl, 1-butenyl or 1-hexenyl, preferably allyl.

Preference is given to compounds of formula I wherein $R^*_1$ and $R^*_2$ are each independently of the other $C_1$–$C_4$alkyl and hydrogen. Especially preferably, either $R^*_1$ and $R^*_2$ are identical and are methyl, ethyl, propyl, butyl or allyl, or they are different and are ethyl and allyl.

To achieve stabilisation in a chlorine-containing polymer, the compounds of component A) are to be used in an amount of advantageously from 0.01 to 10% by weight, preferably from 0.05 to 5% by weight, and especially from 0.1 to 3% by weight.

The compounds of the groups mentioned under B) are illustrated as follows:

Perchlorate compounds

Examples are those of formula $M(ClO_4)_n$, wherein M is Li, Na, K, Mg, Ca, Sr, Zn, Al, La or Ce. According to the value of M, the index n is 1, 2 or 3. The perchlorate salts may be complexed with alcohols (polyols, cyclodextrins) or ether alcohols or ester alcohols. The ester alcohols include also the polyol partial esters. Also suitable in the case of polyhydric alcohols or polyols are their dimers, trimers, oligomers and polymers, such as di-, tri-, tetra- and poly-glycols, and di-, tri- and tetra-pentaerythritol or polyvinyl alcohol in various degrees of polymerisation. The perchlorate salts can be introduced in various known forms, for example in the form of a salt or an aqueous solution applied to a substrate, such as PVC, calcium silicate, zeolites or hydrotalcites, or bound in a hydrotalcite by chemical reaction. Glycerol monoethers and glycerol monothioethers are preferred as polyol partial ethers. Other forms are described in EP 394 547, EP 457 471 and WO 94/24 200.

The perchlorates can be used in an amount of, for example, from 0.001 to 5, advantageously from 0.01 to 3, especially from 0.01 to 2, parts by weight, based on 100 parts by weight PVC.

Glycidyl compounds

These contain the glycidyl group

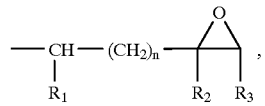

which is bonded directly to carbon, oxygen, nitrogen or sulfur atoms and wherein either $R_1$ and $R_3$ are both hydrogen, $R_2$ is hydrogen or methyl and n=0, or $R_1$ and $R_3$ together are —$CH_2$—$CH_2$— or —$CH_2$—$CH_2$—$CH_2$—, in which case $R_2$ is hydrogen and n=0 or 1.

I) Glycidyl and b-methylglycidyl esters obtainable by reacting a compound having at least one carboxy group in the molecule with epichlorohydrin or glycerol dichlorohydrin or b-methyl-epichlorohydrin. The reaction is advantageously carried out in the presence of bases.

Aliphatic carboxylic acids may be used as compounds having at least one carboxy group in the molecule. Examples of those carboxylic acids are glutaric acid, adipic acid, pimelic acid, suberic acid, azelaic acid, sebacic acid or dimerised or trimerised linoleic acid, acrylic acid and methacrylic acid, caproic acid, caprylic acid, lauric acid, myristic acid, palmitic acid, stearic acid and pelargonic acid, and the acids mentioned in connection with the organic zinc compounds.

It is, however, also possible to use cycloaliphatic carboxylic acids, such as cyclohexanecarboxylic acid, tetrahydrophthalic acid, 4-methyltetrahydrophthalic acid, hexahydrophthalic acid or 4-methylhexahydrophthalic acid.

It is also possible to use aromatic carboxylic acids, such as benzoic acid, phthalic acid, isophthalic acid, trimellitic acid or pyromellitic acid.

Carboxy-terminated adducts, for example of trimellitic acid and polyols, such as glycerol or 2,2-bis(4-hydroxycyclohexyl)propane can also be used.

Other epoxide compounds that can be used within the scope of this invention are to be found in EP 0 506 617.

II) Glycidyl or (b-methylglycidyl) ethers obtainable by reacting a compound having at least one free alcoholic hydroxy group and/or phenolic hydroxy group and a suitably substituted epichlorohydrin under alkaline conditions, or in the presence of an acid catalyst with subsequent treatment with an alkali.

Ethers of that type are derived, for example, from acyclic alcohols, such as ethylene glycol, diethylene glycol and higher poly(oxyethylene) glycols, propane-1,2-diol, or poly (oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, sorbitol, and from polyepichlorohydrins, butanol, amyl alcohol, pentanol, and from monofunctional alcohols, such as isooctanol, 2ethylhexanol, isodecanol and $C_7$–$C_9$alkanol and $C_9$–$C_{11}$alkanol mixtures.

They are, however, also derived, for example, from cycloaliphatic alcohols, such as 1,3- or 1,4-dihydroxycyclohexane, bis(4-hydroxycyclohexyl)methane, 2,2-bis(4-hydroxycyclohexyl)propane or 1,1-bis (hydroxymethyl)cyclohex-3-ene, or they have aromatic nuclei, such as N,N-bis(2-hydroxyethyl)aniline or p,p'-bis (2-hydroxyethylamino)diphenylmethane.

The epoxide compounds can also be derived from mononuclear phenols, such as phenol, resorcinol or hydroquinone, or they are based on polynuclear phenols, such as bis(4-hydroxyphenyl)methane, 2,2-bis(4-hydroxyphenyl)propane, 2,2-bis(3,5-di bromo-4-hydroxyphenyl)propane, 4,4'-dihydroxydiphenylsulfone, or on condensation products of phenols with formaldehyde obtained under acid conditions, such as phenol novolaks.

Other possible terminal epoxides are, for example: glycidyl-1-naphthyl ether, glycidyl-2-phenylphenyl ether, 2-biphenylglycidyl ether, N-(2,3-epoxypropyl) phthalimide and 2,3-epoxypropyl-4-methoxyphenyl ether.

III) (N-Glycidyl) compounds obtainable by dehydrochlorinating the reaction products of epichlorohydrin with amines containing at least one aminohydrogen atom. Those amines are, for example, aniline, N-methylaniline, toluidine, n-butylamine, bis(4-aminophenyl)methane, m-xylylenediamine or bis(4-methylaminophenyl)methane, but also N,N,O-triglycidyl-m-aminophenol or N,N,O-triglycidyl-p-aminophenol.

The (N-glycidyl) compounds also include, however, N,N'-di-, N,N',N"-triand N,N',N",N'"-tetra-glycidyl derivatives of cycloalkyleneureas, such as ethyleneurea or 1,3-propyleneurea, and N,N'-diglycidyl derivatives of hydantoins, such as 5,5-dimethylhydantoin or glycoluril and triglycidyl isocyanurate.

IV) S-Glycidyl compounds, such as di-S-glycidyl derivatives, that are derived from dithiols, such as ethane-1,2-dithiol or bis(4-mercaptomethylphenyl) ether.

V) Epoxide compounds containing a radical of formula I wherein $R_1$ and $R_3$ together are —$CH_2$—$CH_2$— and n is 0 are bis(2,3-epoxycyclopentyl) ether, 2,3-epoxycyclopentylglycidyl ether or 1,2-bis(2,3-epoxycyclopentyloxy)ethane. An epoxy resin containing a radical of formula I wherein $R_1$ and $R_3$ together are —$CH_2$—$CH_2$— and n is 1 is, for example, 3,4-epoxy-6-methylcyclohexanecarboxylic acid (3',4'-epoxy-6'-methylcyclohexyl)-methyl ester.

Suitable terminal epoxides are, for example (™ denotes®):

a) liquid diglycidyl ethers of bisphenol A, such as Araldite™GY 240, Araldite™AGY 250, Araldite™GY 260, Araldite™GY 266, Araldite™GY 2600, Araldite™MY 790;

b) solid diglycidyl ethers of bisphenol A, such as Araldite™GT 6071, Araldite™GT 7071, Araldite™GT 7072, Araldite™GT 6063, Araldite™GT 7203, Araldite™GT 6064, Araldite™GT 7304, Araldite™GT 7004, Araldite™GT 6084, Araldite™GT 1999, Araldite™GT 7077, Araldite™GT 6097, Araldite™GT 7097, Araldite™GT 7008, Araldite™GT 6099, Araldite™GT 6608, Araldite™GT 6609, Araldite™GT 6610;

c) liquid diglycidyl ethers of bisphenol F, such as Araldite™GY 281, Araldite™PY 302, Araldite™PY 306;

d) solid polyglycidyl ethers of tetraphenylethane, such as CG Epoxy Resin™0163;

e) solid and liquid polyglycidyl ethers of phenolformaldehyde novolak, such as EPN 1138, EPN 1139, GY 1180, PY 307;

f) solid and liquid polyglycidyl ethers of o-cresolformaldehyde novolak, such as ECN 1235, ECN 1273, ECN 1280, ECN 1299;

g) liquid glycidyl ethers of alcohols, such as Shell™glycidyl ether 162, Araldite™DY 0390, Araldite™DY 0391;

h) liquid glycidyl ethers of carboxylic acids, such as Shell™Cardura E terephthalic acid ester, trimellitic acid ester, Araldite™PY 284;

i) solid heterocyclic epoxy resins (triglycidyl isocyanurate), such as Araldite™PT 810;

j) liquid cycloaliphatic epoxy resins, such as Araldite™CY 179;

k) liquid N,N,O-triglycidyl ethers of p-aminophenol, such as Araldite™MY 0510;

l) tetraglycidyl-4,4'-methylenebenzamine or N,N,N',N'-tetraglycidyl-diaminophenylmethane, such as Araldite™MY 720, Araldite™MY 721.

Preference is given to the use of epoxide compounds having two functional groups. It is, however, also possible in principle to use epoxide compounds having one, three or more functional groups.

There are used predominantly epoxide compounds, especially diglycidyl compounds, having aromatic groups.

Where appropriate, a mixture of different epoxide compounds can also be used.

Especially preferred as terminal epoxide compounds are diglycidyl ethers based on bisphenols, such as 2,2-bis(4-hydroxyphenyl)propane (bisphenol A), bis(4- hydroxyphenyl)-methane or mixtures of bis(ortho/para-hydroxyphenyl)methane (bisphenol F).

The terminal epoxide compounds can be used in an amount of, preferably, at least 0.1 part, for example from 0.1 to 50, advantageously from 1 to 30, and especially from 1 to 25, parts by weight, based on 100 parts by weight PVC.

Beta-diketones, beta-keto esters 1,3-Dicarbonyl compounds that can be used may be linear or cyclic dicarbonyl compounds. Preference is given to the use of dicarbonyl compounds of the following formula:

P'$_1$CO CHR$_2$'—COR'$_3$ wherein

R'$_1$ is C$_1$–C$_{22}$alkyl, C$_5$–C$_{10}$hydroxyalkyl, C$_2$–C$_{18}$alkenyl, phenyl, phenyl substituted by OH, C$_1$–C$_4$alkyl, C$_1$–C$_4$alkoxy or by halogen, C$_7$–C$_{10}$phenylalkyl, C$_5$–C$_{12}$cycloalkyl, C$_5$–C$_{12}$cycloalkyl substituted by C$_1$–C$_4$alkyl, or is a group —R'$_5$—S—R'$_6$ or —R'$_5$—O—R'$_6$, R'2 is hydrogen, C$_1$–C$_8$alkyl, C$_2$–C$_{12}$alkenyl, phenyl, C$_7$—C$_{12}$alkylphenyl, C$_7$-C$_{10}$phenylalkyl or a group —CO—R'4, R'$_3$ has one of the meanings given for R'$_1$ or is C$_1$–C$_{18}$alkoxy, R'$_4$ is C$_1$–C$_4$alkyl or phenyl, R'$_5$ is C$_1$—C$_{10}$alkylene and R'$_6$ is C$_1$–C$_{12}$alkyl, phenyl, C$_7$–C$_{18}$alkylphenyl or C$_7$-C$_{10}$phenylalkyl.

Those compounds include the hydroxy group-containing diketones of EP 346 279 and the oxa- and thia-diketones of EP 307 358, as well as the keto esters based on isocyanic acid of U.S. Pat No. 4,339,383.

R'$_1$ and R'$_3$ as alkyl may be, especially, C$_1$–C$_{18}$alkyl, such as methyl, ethyl, n-propyl, isopropyl, n-butyl, tert-butyl, pentyl, hexyl, heptyl, octyl, decyl, dodecyl or octadecyl.

R'$_1$ and R'$_3$ as hydroxyalkyl are, especially, a group —(CH$_2$)$_n$—OH, wherein n is 5, 6 or 7.

R'$_1$ and R'$_3$ as alkenyl may be, for example, vinyl, allyl, methallyl, 1-butenyl, 1hexenyl or oleyl, preferably allyl.

R'$_1$ and R'$_3$ as phenyl substituted by OH, alkyl, alkoxy or halogen may be, for example, tolyl, xylyl, tert-butylphenyl, methoxyphenyl, ethoxyphenyl, hydroxyphenyl, chlorophenyl or dichlorophenyl.

R'$_1$ and R'$_3$ as phenylalkyl are especially benzyl. R'$_2$ and R'$_3$ as cycloalkyl or alkylcycloalkyl are especially cyclohexyl or methylcyclohexyl.

R'$_2$ as alkyl may be, especially, C$_1$–C$_4$alkyl. R'$_2$ as C$_2$–C$_{12}$alkenyl may be, especially, allyl. R'$_2$ as alkylphenyl may be, especially, tolyl. R'$_2$ as phenylalkyl may be, especially, benzyl. R'$_2$ is preferably hydrogen. R'$_3$ as alkoxy may be, for example, methoxy, ethoxy, butoxy, hexyloxy, octyloxy, dodecyloxy, tridecyloxy, tetradecyloxy or octadecyloxy. R'$_5$ as C$_1$–C$_{10}$alkylene is especially C$_2$–C$_4$alkylene.

R'$_6$ as alkyl is especially C$_4$–C$_{12}$alkyl, such as butyl, hexyl, octyl, decyl or dodecyl. R'$_6$ as alkylphenyl is especially tolyl. R'$_6$ as phenylalkyl is especially benzyl.

Examples of 1,3-dicarbonyl compounds of the above formula and their alkali metal, alkaline earth metal and zinc chelates are acetylacetone, butanoylacetone, heptanoylacetone, stearoylacetone, palmitoylacetone, lauroylacetone, 7-tert-nonylthio-heptane-2,4-dione, benzoylacetone, dibenzoylmethane, lauroylbenzoylmethane, palmitoyl-benzoylmethane, stearoyl-benzoylmethane, isooctylbenzoylmethane, 5-hydroxycapronyl-benzoylmethane, tribenzoylmethane, bis(4-methylbenzoyl) methane, benzoyl-p-chlorobenzoylmethane, bis(2-hydroxybenzoyl)methane, 4-methoxybenzoyl-benzoylmethane, bis(4-methoxybenzoyl)methane, 1-benzoyl-1-acetylnonane, benzoyl-acetylphenylmethane, stearoyl-4-methoxybenzoylmethane, bis(4-tert-butylbenzoyl)methane, benzoyl-formylmethane, benzoyl-phenylacetylmethane, biscyclohexanoyl-methane, di-pivaloyl-methane, 2-acetylcyclopentanone, 2-benzoylcyclopentanone, diacetoacetic acid methyl, ethyl and allyl ester, benzoyl-, propionyl- and butyryl-acetoacetic acid methyl and ethyl ester, triacetylmethane, acetoacetic acid methyl, ethyl, hexyl, octyl, dodecyl or octadecyl ester, benzoylacetic acid methyl, ethyl, butyl, 2-ethylhexyl, dodecyl or octadecyl ester, and propionyl- and butyryl-acetic acid C$_1$–C$_{18}$alkyl ester. Stearoylacetic acid ethyl, propyl, butyl, hexyl or octyl ester and polynuclear β-keto esters as described in EP 433 230 and dehydroacetic acid and the zinc, magnesium or alkali metal salts thereof.

Preference is given to 1,3-diketo compounds of the above formula wherein R'$_1$ is C$_1$–C$_{18}$alkyl, phenyl, phenyl substituted by OH, methyl or by methoxy, C$_7$-C$_{10}$phenylalkyl or cyclohexyl, R'$_2$ is hydrogen and R'$_3$ has one of the meanings given for R'$_1$.

The 1,3-diketo compounds can be used in an amount of, for example, from 0.01 to 10, advantageously from 0.01 to 3, and especially from 0.01 to 2, parts by weight, based on 100 parts by weight PVC.

Dihydropyridines, polydihydropyridines

Suitable monomeric, dihydropyridines are described, for example, in FR 20 39 496, EP 2007, EP 0 362 012, EP 0 286 887 and EP 0 024 754.

Preference is given to those of the formula

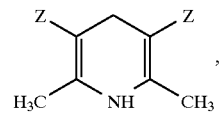

wherein Z is CO$_2$CH$_3$, CO$_2$C$_2$H$_5$, CO$_2$"C$_{12}$H$_{25}$ or CO$_2$C$_2$H$_4$S"C$_{12}$H$_{25}$.

Suitable polydihydropyridines are especially compounds of the following formula

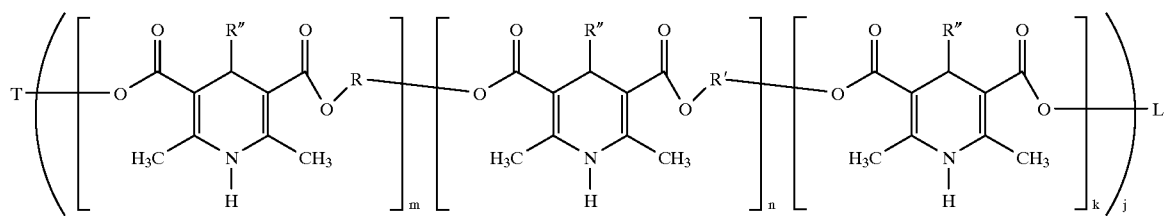

wherein T is $C_1$–$C_{22}$alkyl that is unsubstituted or substituted by $C_1$–$C_{18}$alkoxy, $C_1$–$C_{18}$alkylthio, hydroxy, acryloyloxy, methacryloyloxy, halogen, phenyl or by naphthyl;

$C_5$–$C_{10}$aryl that is unsubstituted or substituted by $C_1$–$C_{18}$alkyl, $C_1$–$C_{18}$alkoxy or by halogen and that may also be heterocyclic;

$C_3$–$C_{10}$alkenyl, $CH_3$—CO—$CH_2$—CO—OR'—, $CH_3$—CO—$CH_2$—COO—R', $CH_3$—C(NR'''$_2$)=CH—COOR— or $CH_3$—C(NR'''$_2$)=CHCO—OR'—;

L has the same meanings as T or is a tri- or poly-valent radical from an unsubstituted or $C_1$–$C_{12}$alkoxy-, $C_1$–$C_{12}$thioalkoxy-, $C_6$–$C_{10}$aryl-, $C_1$–$C_{12}$carboxy- or hydroxy-substituted straight-chained or branched alkyl group, m and n are numbers from 0 to 20, k is 0 or 1, j is a number from 1 to 6 and the conditions j (k+m+n)>1 and m+n>0 are satisfied, R and R' are each independently of the other methylene or phenylene or an alkylene group of the type —(—$C_pH_{2p}$—X—)$_t$ $C_pH_{2p}$— that is unsubstituted or carries substituents from the series $C_1$–$C_{12}$alkoxy, $C_1$–$C_{12}$thioalkoxy, $C_6$–$C_{10}$aryl, $C_1$–$C_{12}$carboxy and hydroxy, p is from 2 to 18, t is from 0 to 10, X is oxygen or sulfur, or, when k is 0 and j>1, R and R' together with L form a direct bond, R" is hydrogen, or $C_1$–$C_{18}$alkyl, $C_2$–$C_{18}$alkoxycarbonyl or $C_6$–$C_{10}$aryl each of which is unsubstituted or substituted by one or more $C_1$–$C_{12}$alkyl, $C_1$–$C_8$alkoxy, halogen or $NO_2$ substituents, and the two R'" radicals are identical or different and are hydrogen, $C_1$–$C_{18}$alkyl, $C_1$–$C_{18}$-hydroxyalkyl or $C_1$–$C_{18}$alkoxyalkyl or together are uninterrupted or O-interrupted $C_3$–$C_5$alkylene, or are straight-chained or branched $C_2$–$C_{22}$alkenyl.

Such compounds are described in more detail in EP 0 286 887.

Thiodiethylene-bis[5-methoxycarbonyl-2,6-di methyl-1,4-dihydropyridine-3-carboxylate] is especially preferred.

Die (Poly-)Dihydropyridine können im chlorhaltigen Polymer zweckmäβig zu 0,001 bis 5 und insbesondere 0,005 bis 1 Gew.-Teilen, bezogen auf das Polymer, angewandt werden.

Polyols, disaccharide alcohols

Examples of suitable compounds of that type are:

pentaerythritol, dipentaerythritol, tripentaerythritol, bistrimethylolpropane, bistrimethylolethane, trismethylolpropane, inosite, polyvinylalcohol, sorbitol, maltite, isomaltite, lactite, lycasin, mannitol, lactose, leucrose, tris(hydroxyethyl) isocyanurate, palatinite, tetramethylolcyclohexanol, tetramethylolcyclopentanol, tetramethylolcyclopyranol, glycerol, diglycerol, polyglycerol, thiodiglycerol or 1-0-a-D-glycopyranosyl-D-mannitol dihydrate. Of those compounds, preference is given to the disaccharide alcohols.

The polyols can be used in an amount of, for example, from 0.01 to 20, advantageously from 0.1 to 20, and especially from 0.1 to 10, parts by weight, based on 100 parts by weight PVC.

Sterically hindered amines (tetraalkylpiperidine compounds)

The sterically hindered amines, especially piperidine compounds, that can be used according to the invention are known especially as light stabilisers. Those compounds contain one or more groups of the formula

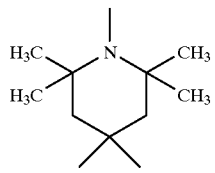

They may be compounds of relatively low molecular weight (<700) or of relatively high molecular weight. In the latter case they may be oligomeric or polymeric products. Preference is given to tetramethylpiperidine compounds having a molecular weight of more than 700 that contain no ester groups.

Especially important as stabilisers are the following classes of tetramethylpiperidine compounds.

In the following classes a) to f), substituents having subscript indices in their formula drawings correspond (for technical reasons) to the substituents having superscript indices in the description or definition belonging to the formula drawing in question. Thus, for example, the substituent "$R_1$" in formula (II) corresponds to "$R^1$" in the descriptions.

a) Compounds of formula II

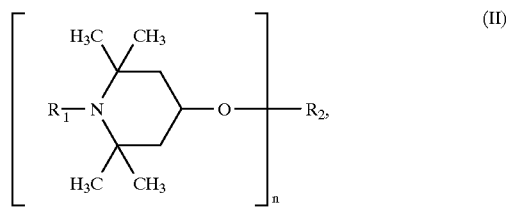

(II)

wherein n is a number from 1 to 4, preferably 1 or 2, $R^1$ is hydrogen, oxy, $C_1$–$C_{12}$alkyl, $C_3$–$C_8$alkenyl, $C_3$–$C_8$alkynyl, $C_7$–$C_{12}$aralkyl, $C_1$–$C_8$alkanoyl, $C_3$–$C_5$alkenoyl, glycidyl or a group —$CH_2CH(OH)$—Z, wherein Z is hydrogen, methyl or phenyl, $R^1$ being preferably $C_1$–$C_4$alkyl, allyl, benzyl, acetyl or acryloyl, and, when n is 1, $R^2$ is hydrogen, $C_1$–$C_{18}$alkyl that is uninterrupted or interrupted by one or more oxygen atoms, cyanoethyl, benzyl, glycidyl, a monovalent radical of an aliphatic, cycloaliphatic, araliphatic, unsaturated or aromatic carboxylic acid, carbamic acid or phosphorus-containing acid or a monovalent silyl radical, preferably a radical of an aliphatic carboxylic acid having from 2 to 18 carbon atoms, a cycloaliphatic carboxylic acid having from 7 to 15 carbon atoms, an α,β-unsaturated carboxylic acid having from 3 to 5 carbon atoms or an aromatic carboxylic acid having from 7 to 15 carbon atoms, and, when n is 2, $R^2$ is $C_1$–$C_{12}$-alkylene, $C_4$–$C_{12}$alkenylene, xylylene, a divalent radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having from 2 to 36 carbon atoms, a cycloaliphatic or aromatic dicarboxylic acid having from 8 to 14 carbon atoms or an aliphatic, cycloaliphatic or aromatic dicarbamic acid having from 8 to 14 carbon atoms, and, when n is 3, $R^2$ is a trivalent radical of an aliphatic, cycloaliphatic or aromatic tricarboxylic acid, an aromatic tricarbamic acid or a phosphorus-containing acid or a trivalent silyl radical and, when n is 4, $R^2$ is a tetravalent radical of an aliphatic, cycloaliphatic or aromatic tetracarboxylic acid.

When any of the substituents are $C_1$–$C_{12}$alkyl, they are, for example, methyl, ethyl, n-propyl, n-butyl, sec-butyl, tert-butyl, n-hexyl, n-octyl, 2-ethyl-hexyl, n-nonyl, n-decyl, n-undecyl or n-dodecyl.

In the meaning of $C_1$–$C_{18}$alkyl, $R^2$ may be, for example, the groups listed above and, in addition, for example, n-tridecyl, n-tetradecyl, n-hexadecyl or n-octadecyl.

When $R^1$ is $C_3$–$C_8$alkenyl, it may be, for example, 1-propenyl, allyl, methallyl, 2-butenyl, 2-pentenyl, 2-hexenyl, 2-octenyl or 4-tert-butyl-2-butenyl.

$R^1$ as $C_3$–$C_8$alkynyl is preferably propargyl.

As $C_7$–$C_{12}$aralkyl, $R^1$ is especially phenethyl and more especially benzyl.

$R^1$ as $C_1$–$C_8$alkanoyl is, for example, formyl, propionyl, butyryl, octanoyl, but preferably acetyl, and as $C_3$–$C_5$alkenoyl is especially acryloyl.

When $R^2$ is a monovalent radical of a carboxylic acid, it is, for example, an acetic acid, caproic acid, stearic acid, acrylic acid, methacrylic acid, benzoic acid or β-(3,5-di-tert-butyl-4-hydroxyphenyl)-propionic acid radical.

When $R^2$ is a divalent radical of a dicarboxylic acid, it is, for example, a malonic acid, succinic acid, glutaric acid, adipic acid, suberic acid, sebacic acid, maleic acid, phthalic acid, dibutylmalonic acid, dibenzylmalonic acid, butyl-(3,5di-tert-butyl-4-hydroxybenzyl)-malonic acid or bicycloheptenedicarboxylic acid radical.

When $R^2$ is a trivalent radical of a tricarboxylic acid, it is, for example, a trimellitic acid or nitrilotriacetic acid radical.

When $R^2$ is a tetravalent radical of a tetracarboxylic acid, it is, for example, the tetravalent radical of butane-1,2,3,4-tetracarboxylic acid or of pyromellitic acid.

When $R^2$ is a divalent radical of a dicarbamic acid, it is, for example, a hexamethylenedicarbamic acid or a 2,4-toluylene-dicarbamic acid radical.

The following compounds are examples of polyalkylpiperidine compounds of that class:

1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-yl-β-(3,5-di-tert-butyl-4-hydroxyphenyl) propionate
9) di(1-benzyl-2,2,6,6-tetramethylpiperidin-4-yl) maleinate
10) di(2,2,6,6-tetramethylpiperidin-4-yl) succinate
11) di(2,2,6,6-tetramethylpiperidin-4-yl) glutarate
12) di(2,2,6,6-tetramethylpiperidin-4-yl) adipate
13) di(2,2,6,6-tetramethylpiperidin-4-yl) sebacate
14) di(1,2,2,6,6-pentamethylpiperidin-4-yl) sebacate
15) di(1,2,3,6-tetramethyl-2,6-diethylpiperidin-4-yl) sebacate
16) di(1-allyl-2,2,6,6-tetramethylpiperidin-4-yl) phthalate
17) 1-propargyl-4β-cyanoethyloxy-2,2,6,6-tetramethylpiperidine
18) 1-acetyl-2,2,6,6-tetramethylpiperidin-4-yl acetate
19) trimellitic acid tri(2,2,6,6-tetramethylpiperidin-4-yl) ester
20) 1-acryloyl-4-benzyloxy-2,2,6,6-tetramethylpiperidine
21) diethylmalonic acid di(2,2,6,6-tetramethylpiperidin-4-yl) ester
22) dibutylmalonic acid di(1,2,2,6,6-pentamethylpiperidin-4-yl) ester
23) butyl-(3,5-di-tert-butyl-4-hydroxybenzyl)-malonic acid di(1,2,2,6,6pentamethylpiperidin-4-yl) ester
24) dibenzyl-malonic acid di(1,2,2,6,6-pentamethylpiperidin-4-yl) ester
25) dibenzyl-malonic acid di(1,2,3,6-tetramethyl-2,6-diethyl-piperidin-4-yl) ester
26) hexane-1',6'-bis(4-carbamoyloxy-1-n-butyl-2,2,6,6-tetramethyl-piperidine)
27) toluene-2',4'-bis(4-carbamoyloxy-1-n-propyl-2,2,6,6-tetramethylpiperidine)
28) dimethyl-bis(2,2,6,6-tetramethylpiperidin-4-oxy)silane
29) phenyl-tris(2,2,6,6-tetramethylpiperidin-4-oxy)silane
30) tris(1-propyl-2,2,6,6-tetramethylpiperidin-4-yl) phosphite
31) tris(1-propyl-2,2,6,6-tetramethylpiperidin-4-yl) phosphate
32) phenyl-[bis(1,2,2,6,6-pentamethylpiperidin-4-yl)] phosphonate
33) 4-hydroxy-1,2,2,6,6-pentamethylpiperidine
34) 4-hydroxy-N-hydroxyethyl-2,2,6,6-tetramethylpiperidine
35) 4-hydroxy-N-(2-hydroxypropyl)-2,2,6,6-tetramethylpiperidine
36) 1-glycidyl-4-hydroxy-2,2,6,6-tetramethylpiperidine b) Compounds of formula (III)

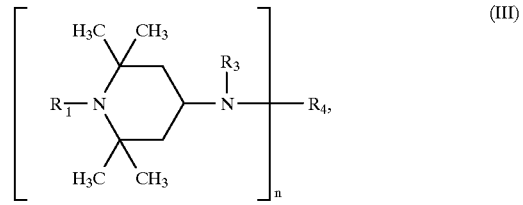

(III)

wherein
n is the number 1 or 2,
$R^1$ is as defined for a),
$R^3$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$alkanoyl, $C_3$–$C_5$alkenoyl or benzoyl, and,
when n is 1, $R^4$ is hydrogen, $C_1$–$C_{18}$alkyl, $C_3$–$C_8$alkenyl, $C_5$–$C_7$cycloalkyl, $C_1$–$C_4$alkyl substituted by a hydroxy, cyano, alkoxycarbonyl or carbamide group, glycidyl, a group of the formula —$CH_2$—CH(OH)—Z or of the formula —CONH—Z, wherein Z is hydrogen, methyl or phenyl; and, when n is 2, $R^4$ is $C_2$–$C_{12}$alkylene, $C_6$–$C_{12}$arylene, xylylene, a —$CH_2$—CH(OH)—$CH_2$— group or a group —$CH_2$—CH(OH)—$CH_2$—O—D—O—, wherein D is $C_2$–$C_{10}$alkylene, $C_6$–$C_{15}$arylene or $C_6$–$C_{12}$cycloalkylene, or,
with the proviso that $R^3$ is not alkanoyl, alkenoyl or benzoyl,
$R^4$ may also be a divalent radical of an aliphatic, cycloaliphatic or aromatic dicarboxylic acid or dicarbamic acid or also the group —CO— or,
when n is 1, $R^3$ and $R^4$ together may be the divalent radical of an aliphatic, cycloaliphatic or aromatic 1,2- or 1,3-dicarboxylic acid.

When any of the substituents are $C_1$–$C_{12}$- or $C_1$–$C_{18}$-alkyl, they are as already defined above under a).

When any of the substituents are $C_5$–$C_7$cycloalkyl, they are especially cyclohexyl.

As $C_7$–$C_8$aralkyl, $R^3$ is especially phenylethyl or more especially benzyl. As $C_2$–$C_5$hydroxyalkyl, $R^3$ is especially 2-hydroxyethyl or 2-hydroxypropyl.

$R^3$ as $C_2$–$C_{18}$alkanoyl is, for example, propionyl, butyryl, octanoyl, dodecanoyl, hexadecanoyl, octadecanoyl, but preferably acetyl, and as $C_3$–$C_5$alkenoyl is especially acryloyl.

When $R^4$ is $C_2$–$C_8$alkenyl, then it is, for example, allyl, methallyl, 2-butenyl, 2-pentenyl, 2-hexenyl or 2-octenyl.

$R^4$ as $C_1$–$C_4$alkyl substituted by a hydroxy, cyano, alkoxycarbonyl or carbamide group may be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)-ethyl.

When any of the substituents are $C_2$–$C_{12}$alkylene, they are, for example, ethylene, propylene, 2,2-dimethylpropylene, tetramethylene, hexamethylene, octamethylene, decamethylene or dodecamethylene.

When any of the substituents are $C_6$–$C_{15}$arylene, they are, for example, o-, m- or p-phenylene, 1,4-naphthylene or 4,4'-diphenylene.

As $C_6$–$C_{12}$cycloalkylene, D is especially cyclohexylene.

The following compounds are examples of polyalkylpiperidine compounds of that class:

37) N,N'-bis(2,2,6,6-tetramethylpiperidin-4-yl) hexamethylene-1,6-diamine
38) N,N'-bis(2,2,6,6-tetramethylpiperidin-4-yl) hexamethylene-1,6-diacetamide and 1,6-diformamide
39) 1-acetyl-4-(N-cyclohexylacetamido)-2,2,6,6-tetramethylpiperidine
40) 4-benzoylamino-2,2,6,6-tetramethylpiperidine
41) N,N'-bis(2,2,6,6-tetramethylpiperidin-4-yl)-N,N'-dibutyl-adipamide
42) N,N'-bis(2,2,6,6-tetramethylpiperidin-4-yl)-N,N'-dicyclohexyl-2-hydroxypropylene-1,3-diamine
43) N,N'-bis(2,2,6,6-tetramethylpiperidin-4-yl)-p-xylylene-diamine
44) N,N'-bis(2,2,6,6-tetramethylpiperidin-4-yl)succine-diamide
45) N-(2,2,6,6-tetramethylpiperidin-4-yl)-β-aminodipropionic acid di(2,2,6,6-tetramethylpiperidin-4-yl) ester
46) the compound of the formula

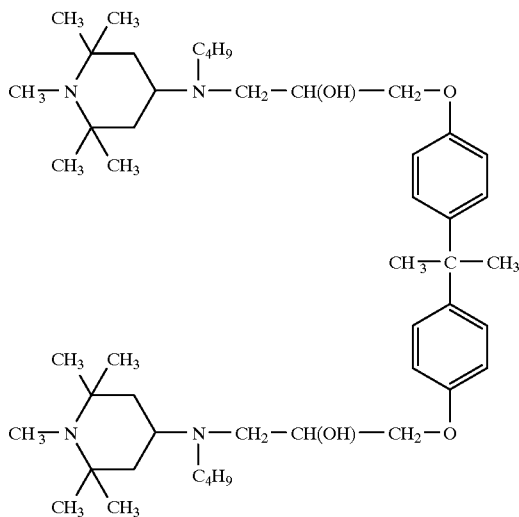

47) 4-(bis-2-hydroxyethyl-amino)-1,2,2,6,6-pentamethylpiperidine
48) 4-(3-methyl-4-hydroxy-5-tert-butyl-benzoic acid amido)-2,2,6,6-tetramethylpiperidine
49) 4-methacrylamido-1,2,2,6,6-pentamethylpiperidine c) Compounds of formula (IV)

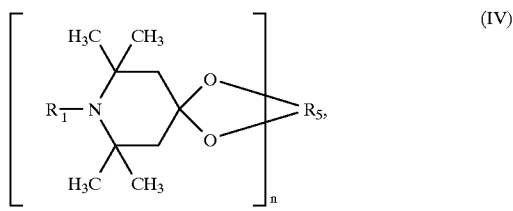

wherein
n is the number 1 or 2,
$R^1$ is as defined under a) and,
when n is 1, $R^5$ is $C_2$–$C_8$alkylene or $C_2$–$C_8$hydroxyalkylene or $C_4$–$C_{22}$acyloxyalkylene, and, when n is 2, $R^5$ is the group $(-CH_2)_2C(CH_2-)_2$.

When $R^5$ is $C_2$–$C_8$alkylene or $C_2$–$C_8$hydroxyalkylene, it is, for example, ethylene, 1-methyl-ethylene, propylene, 2-ethyl-propylene or 2-ethyl-2-hydroxymethylpropylene.

As $C_4$–$C_{22}$acyloxyalkylene, $R^5$ is, for example, 2-ethyl-2-acetoxymethylpropylene.

The following compounds are examples of polyalkylpiperidine compounds of that class:

50) 9-aza-8,8,10,10-tetramethyl-1,5-dioxaspiro[5.5]undecane
51) 9-aza-8,8,10,10-tetramethyl-3-ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl-1,5-dioxaspiro[5.5]undecane
54) 9-aza-3-ethyl-3-acetoxymethyl-9-acetyl-8,8,10,10-tetramethyl-1,5dioxaspiro[5.5]undecane
55) 2,2,6,6-tetramethylpiperidine-4-spiro-2'-(1',3'-dioxane)-5'-spiro-5"-(1",3"-dioxane)-2"-spiro-4'''-(2''',2''',6''',6'''-tetramethylpiperidine).

d) Compounds of formulae VA, VB and VC

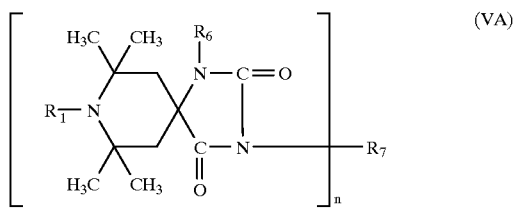

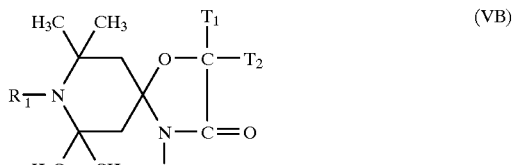

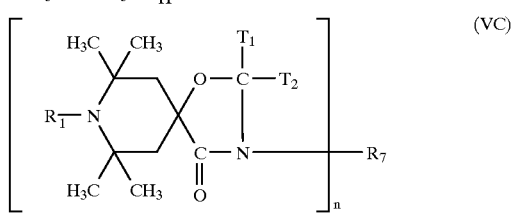

wherein
n is the number 1 or 2,
$R^1$ is as defined under a), $R^6$ is hydrogen, $C_1$–$C_{12}$alkyl, allyl, benzyl, glycidyl or $C_2$–$C_6$alkoxyalkyl and, when n is 1, $R^7$ is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of the formula —(CH$_2$)p—COO—Q or of the formula —(CH$_2$)p—O—CO—Q, wherein p is 1 or 2 and Q is $C_1$–$C_4$alkyl or phenyl, and, when n is 2, $R^7$ is $C_2$–$C_{12}$alkylene, $C_4$–$C_{12}$alkenylene, $C_6$–$C_{12}$arylene, a group —CH$_2$—CH(OH)—CH$_2$—O—D—CH$_2$—CH(OH)—CH$_2$—, wherein D is $C_2$–$C_{10}$alkylene, $C_6$–$C_{15}$arylene, $C_6$–$C_{12}$cycloalkylene, or a group —CH$_2$CH(OZ')CH$_2$—(OCH$_2$—CH(OZ')CH$_2$)$_2$— wherein Z' is hydrogen, $C_1$–$C_{18}$alkyl, allyl, benzyl, $C_2$–$C_{12}$alkanoyl or benzoyl, $T_1$ and $T_2$ are each independently of the other hydrogen, $C_1$–$C_{18}$alkyl, or unsubstituted or halo- or $C_1$–$C_4$alkyl-substituted $C_6$–$C_{10}$aryl or $C_7$–$C_9$aralkyl, or $T_1$ and $T_2$ together with the carbon atom that binds them form a $C_5$–$C_{12}$cycloalkane ring.

When any of the substituents are $C_1$–$C_{12}$alkyl, they are, for example, methyl, ethyl, n-propyl, n-butyl, sec-butyl, tert-butyl, n-hexyl, n-octyl, 2-ethyl-hexyl, n-nonyl, n-decyl, n-undecyl or n-dodecyl.

Any substituents having the definition of $C_1$–$C_{18}$alkyl may be, for example, the groups listed above and in addition, for example, n-tridecyl, n-tetradecyl, n-hexadecyl or n-octadecyl.

When any of the substituents are $C_2$–$C_6$alkoxyalkyl, they are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

When $R_7$ is $C_3$–$C_5$alkenyl, it is, for example, 1-propenyl, allyl, methallyl, 2butenyl or 2-pentenyl.

As $C_7$–$C_9$aralkyl, R , $T_1$ and $T_2$ are especially phenethyl or more especially benzyl. When $T_1$ and $T_2$ together with the carbon atom form a cycloalkane ring, that ring may be, for example, a cyclopentane, cyclohexane, cyclooctane or cyclododecane ring.

When $R^7$ is $C_2$–$C_4$hydroxyalkyl, it is, for example, 2-hydroxyethyl, 2hydroxypropyl, 2-hydroxybutyl or 4-hydroxybutyl.

As $C_6$–$C_{10}$aryl, $R^7$, $T_1$ and $T_2$ are especially phenyl, α- or β-naphthyl, which are unsubstituted or substituted by halogen or by $C_1$–$C_4$alkyl.

When $R^7$ is $C_2$–$C_{12}$alkylene, it is, for example, ethylene, propylene, 2,2dimethylpropylene, tetramethylene, hexamethylene, octamethylene, decamethylene or dodecamethylene.

As $C_4$–$C_{12}$alkenylene, $R^7$ is especially 2-butenylene, 2-pentenylene or 3-hexenylene.

When $R^7$ is $C_6$–$C_{12}$arylene, it is, for example, o-, m- or p-phenylene, 1,4naphthylene or 4,4'-diphenylene.

When Z' is $C_2$–$C_{12}$alkanoyl, it is, for example, propionyl, butyryl, octanoyl, dodecanoyl, but preferably acetyl.

D as $C_2$–$C_{10}$alkylene, $C_6$–$C_{15}$arylene or $C_6$–$C_{12}$cycloalkylene is as defined under b).

The following compounds are examples of polyalkylpiperidine compounds of that class:

56) 3-benzyl-1,3,8-triaza-7,7,9,9-tetramethylspiro[4.5]decane-2,4-dione
57) 3-n-octyl-1,3,8-triaza-7,7,9,9-tetramethylspiro[4.5]decane-2,4-dione
58) 3-allyl-1,3,8-triaza-1,7,7,9,9-pentamethylspiro[4.5]decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxospiro[4.5]decane
62) 2,2-di butyl-7,7,9,9-tetramethyl-1-oxa-3,8-diaza-4-oxospiro[4.5]decane
63) 2,2,4,4-tetramethyl-7-oxa-3,20-diaza-21-oxo-dispiro [5.1.11.2 ]henicosane
64) 2-butyl-7,7,9,9-tetramethyl-1-oxa-4,8-diaza-3-oxospiro[4.5]decane
65) 8-acetyl-3-dodecyl-1,3,8-triaza-7,7,9,9-tetramethylspiro [4.5]decane-2,4dione or the compounds of the following formulae:

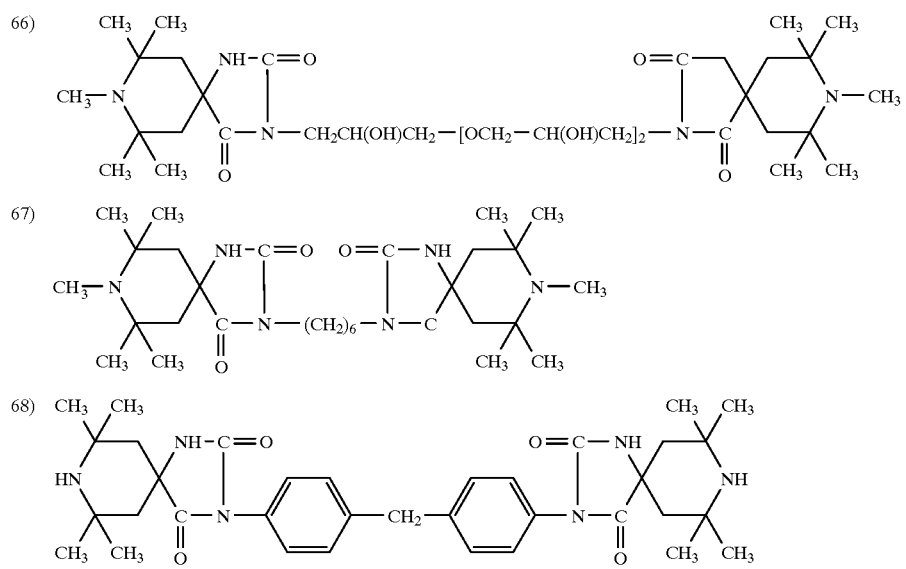

69) 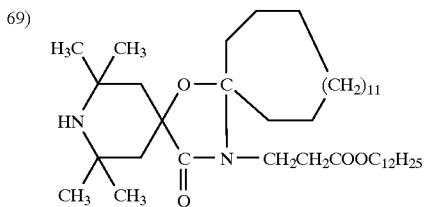

e) Compounds of formula VI

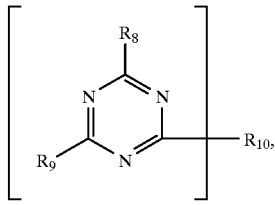
(VI)

wherein n is the number 1 or 2 and $R^8$ is a group of the formula

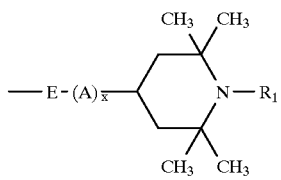

wherein $R^1$ is as defined under a),

E is —O— or —$NR^{11}$—,

A is $C_2$–$C_6$alkylene or —$(CH_2)_3$—O— and x is the number 0 or 1, $R^9$ is identical to $R^8$ or is one of the groups —$NR^{11}R^{12}$, —$OR^{13}$, —$NHCH_2OR^{13}$ or —$N(CH_2OR^{13})_2$, when n=1, $R^{10}$ is identical to $R^8$ or $R^9$ and, when n=2, $R^{10}$ is a group —E—B—E—, wherein B is $C_2$—$C_6$alkylene that is uninterrupted or interrupted by —$N(R^{11})$—, $R^{11}$ is $C_1$–$C_{12}$alkyl, cyclohexyl, benzyl or $C_1$–$C_4$hydroxyalkyl or a group of the formula

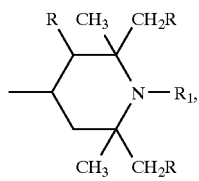

$R^{12}$ is $C_1$–$C_{12}$alkyl, cyclohexyl, benzyl, $C_1$–$C_4$hydroxyalkyl and $R^{13}$ is hydrogen, $C_1$–$C_{12}$alkyl or phenyl, or $R^{11}$ and $R_{12}$ together are $C_4$–$C_5$alkylene or $C_4$–$C_5$oxaalkylene, for example

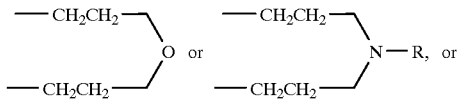

are a group of the formula

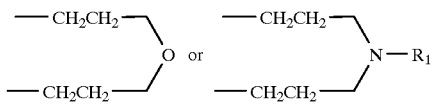

or alternatively $R^{11}$ and $R^{12}$ are each a group of the formula

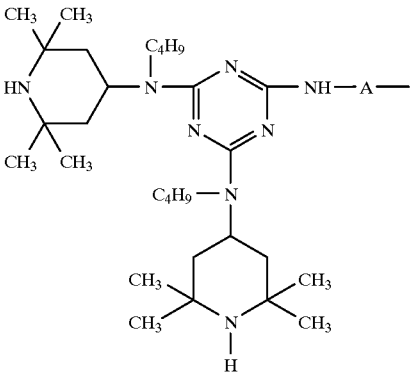

When any of the substituents are $C_1$–$C_{12}$alkyl, they are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

When any of the substituents are $C_1$–$C_4$hydroxyalkyl, they are, for example, 2-hydroxyethyl, 2-hydroxypropyl, 3-hydroxypropyl, 2-hydroxybutyl or 4hydroxybutyl.

When A is $C_2$–$C_6$alkylene, it is, for example, ethylene, propylene, 2,2-dimethylpropylene, tetramethylene or hexamethylene.

When $R^{11}$ and $R^{12}$ together are $C_4$–$C_5$alkylene or $C_4$–$C_5$oxaalkylene, they are, for example, tetramethylene, pentamethylene or 3-oxapentamethylene.

The compounds of the following formulae are examples of polyalkylpiperidine compounds of that class:

70) 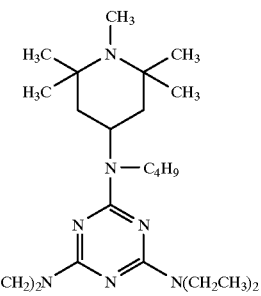
71) 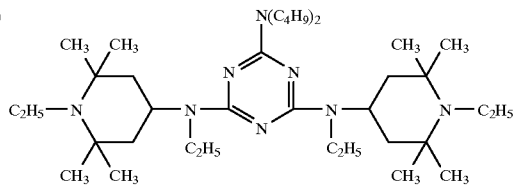
72) 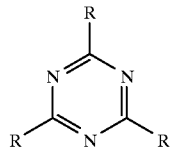
wherein R=
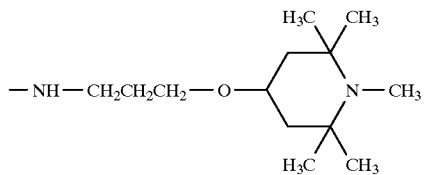
73) 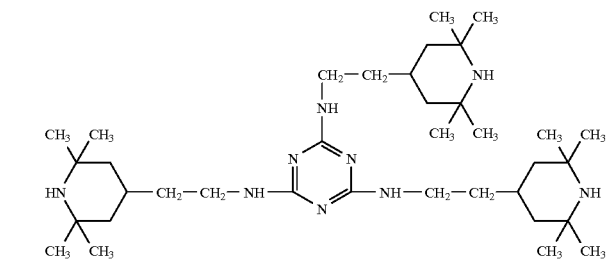
74) 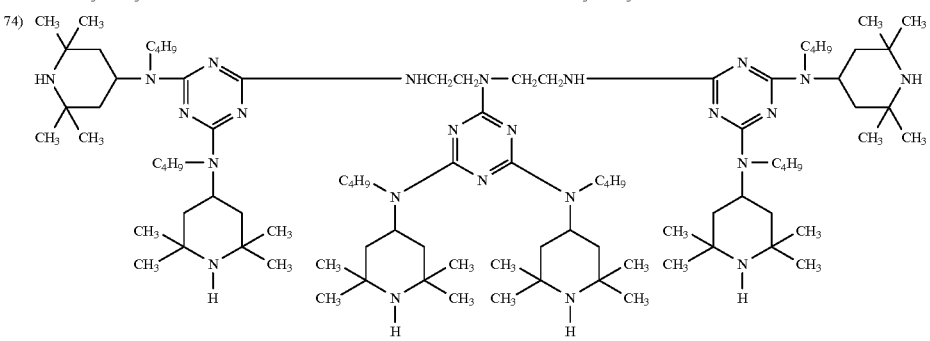
75) 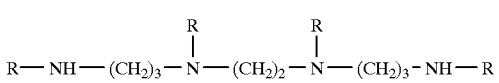

, wherein R is
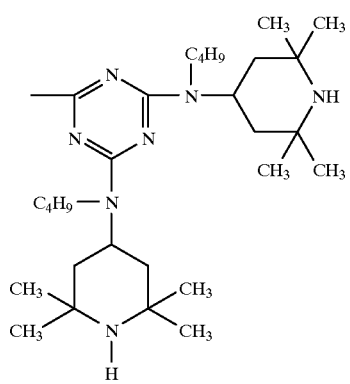
wherein R=
76) 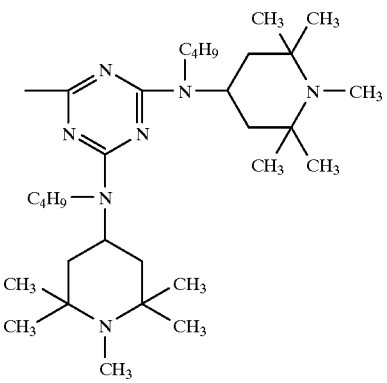
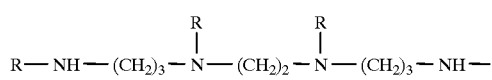
76)
wherein R=
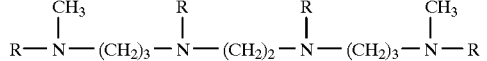
77)
wherein R=
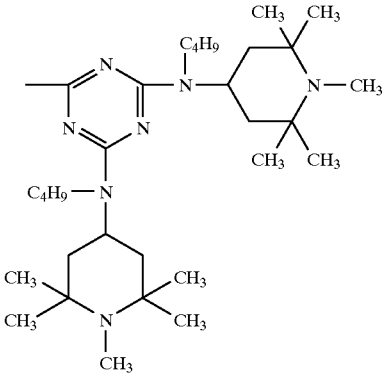
78)
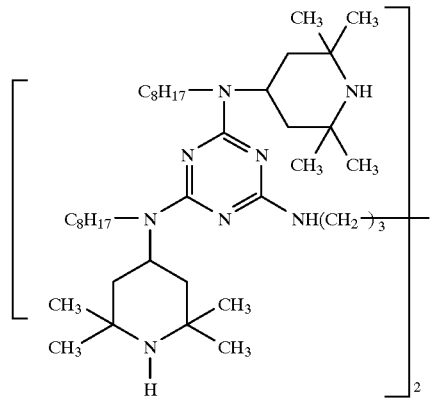

79) 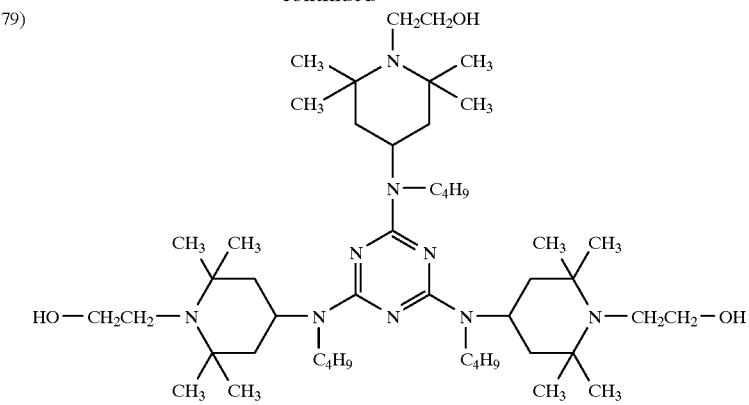

80) 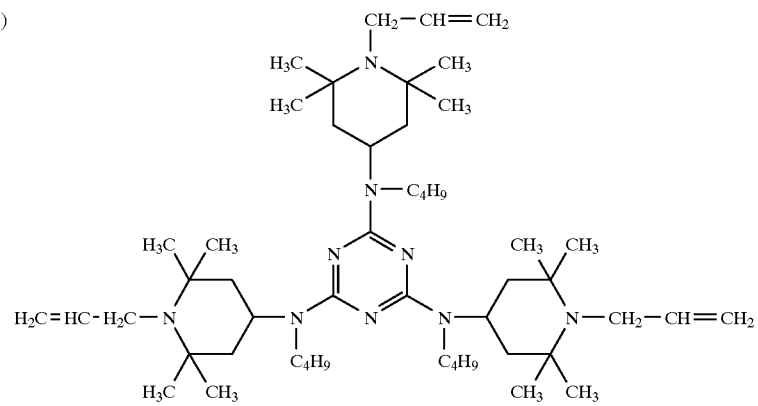

f) Oligomeric or polymeric compounds, the structural repeating unit of which contains one or more 2,2,6,6-tetraalkylpiperidine radicals of formula (I), especially polyesters, polyethers, polyamides, polyamines, polyurethanes, polyureas, polyaminotriazines, poly(meth) acrylates, polysiloxanes, poly(meth)acrylamides and the copolymers thereof that contain such radicals.

Examples of 2,2,6,6-polyalkylpiperidine light stabilisers of that class are the compounds of the following formulae wherein m is a number from 2 to approximately 200.

81) 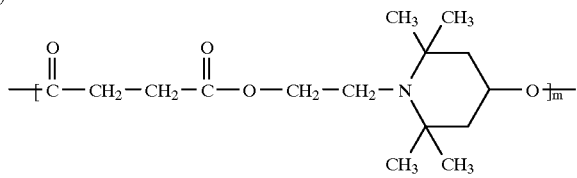

82) 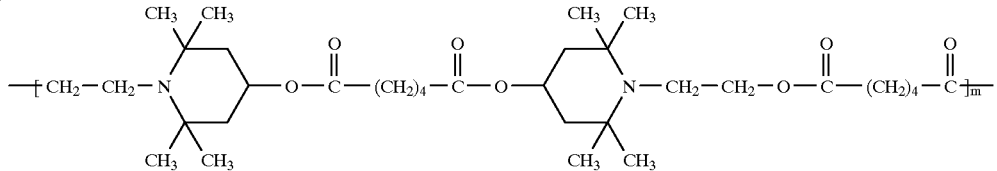

83) 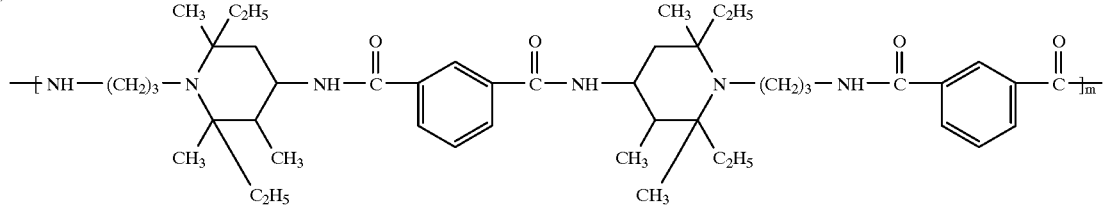

84)
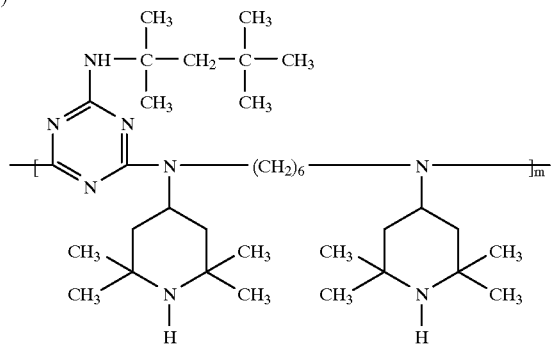
85)
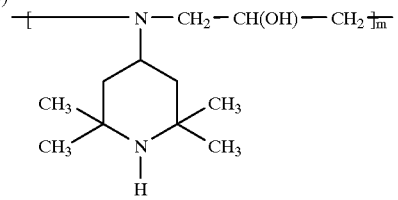
86)
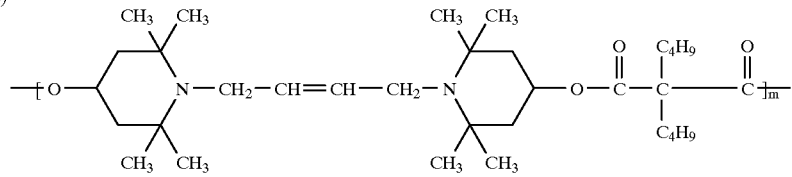
87)
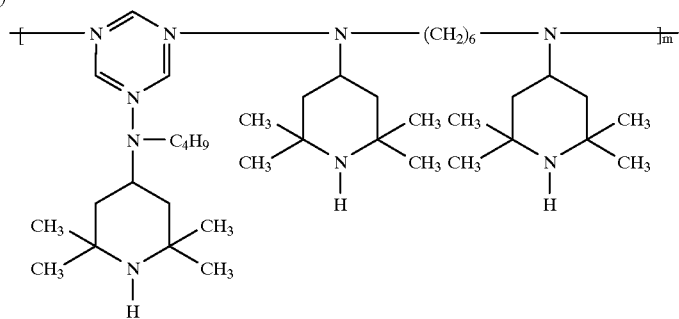
88)
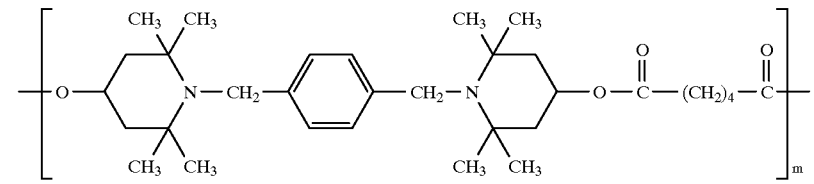
89)
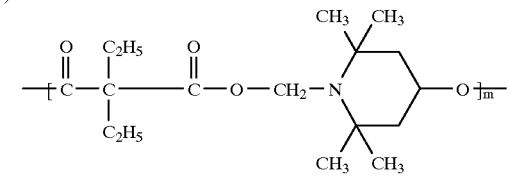

-continued
90)
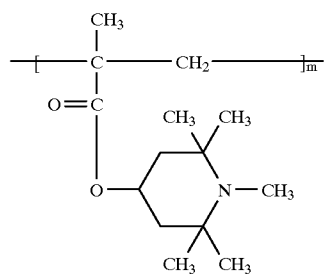
91)
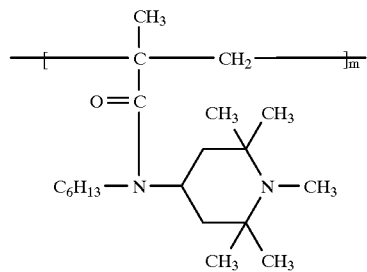
92)
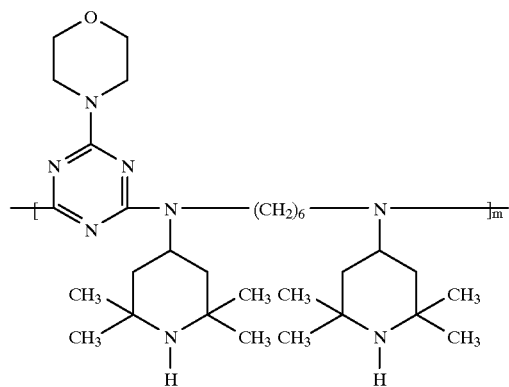
93)
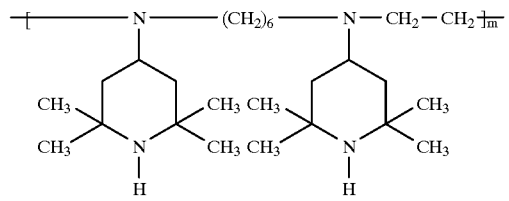
94)
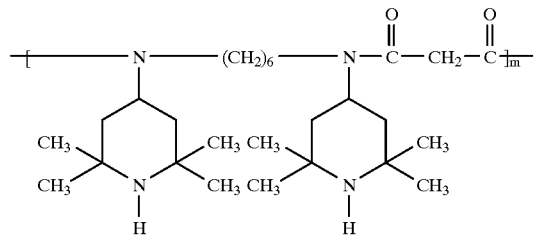

95)

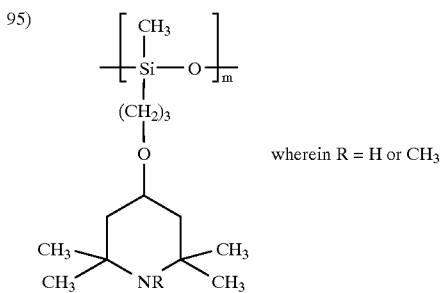

wherein R = H or CH$_3$

96)

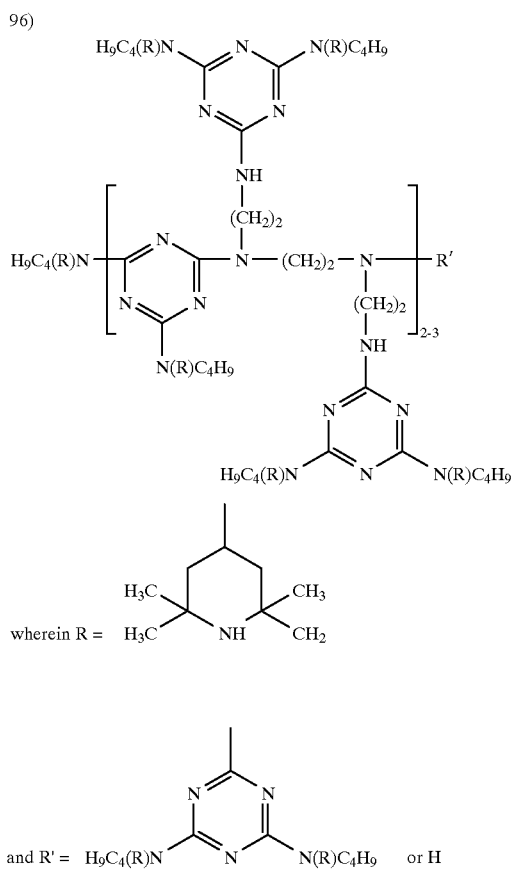

wherein R = and R' =  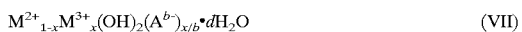 or H

{obtainable by reacting the reaction product of trichlorotriazine and NH$_2$—(CH$_2$)$_3$—NH—(CH$_2$)$_2$—(CH$_2$)$_3$—NH$_2$ with 4-N-butyl-2,2,6,6-tetramethylpiperidine}

Of those classes, classes e) and f) are especially suitable, especially those tetraalkylpiperidine compounds that contain s-triazine groups. Also especially suitable are compounds 74, 76, 84, 87, 92, 95 and 96.

The preparation of the N-piperidinyl-triazines is known from the literature (cf., for example, Houben-Weyl "Methoden der organischen Chemie", Vol. VIII, p. 233–237, 3$^{rd}$ Ed., Thieme Verlag Stuttgart 1971). There may be used as starting material for the reaction with various N-piperidylamines cyanuric chloride, diamino-chloro-1,3,5-triazine or variously substituted bisdialkylamino-chloro-1,3,5-triazines or dialkylamino- or alkylamino-dichloro-1,3,5-triazines.

Technically important examples of tetra- and penta-alkylpiperidine compounds are: bis(2,2,6,6-tetramethyl-piperidyl) sebacate, bis(2,2,6,6tetramethyl-piperidyl) succinate, bis(1,2,2,6,6-pentamethylpiperidyl) sebacate, n-butyl-3,5-di-tert-butyl-4-hydroxybenzyl-malonic acid bis (1,2,2,6,6pentamethylpiperidyl) ester, the condensation product of 1-hydroxyethyl-2,2,6,6-tetramethyl-4-hydroxy-piperidine and succinic acid, the condensation product of N,N'-bis(2,2,6,6-tetramethyl-4-piperidyl)-hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl)-1, 2,3,4-butanetetraoate, 1,1'-(1,2-ethanediyl)-bis(3,3,5,5-tetramethyl-piperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the condensation product of N,N'-bis(2,2,6,6-tetramethyl-4-piperidyl)hexamethylenediamine and 4-morpholino-2,6-dichloro-1,3,5-triazine, the condensation product of 2-chloro-4,6-di(4-n-butylamino-2,2,6,6-tetramethylpiperidyl)-1,3,5-triazine and 1,2-bis(3-aminopropylamino)ethane, the condensation product of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)-pyrrolidine-2,5-dione.

Instead of a single sterically hindered amine, it is possible within the scope of the present invention also to use a mixture of different sterically hindered amines.

The amount of sterically hindered amine added depends on the desired degree of stabilisation. In general, from 0.01 to 0.5% by weight, especially from 0.05 to 0.5% by weight, based on the polymer, is added.

Hydrotalcites and alkali (alkaline earth) aluminosilicates (zeolites)

The chemical composition of these compounds is known to a person skilled in the art, for example from patent specifications DE 38 43 581, U.S. Pat. No. 40,00,100, EP 062 813, WO 93/20135.

Compounds from the hydrotalcite series can be described by general formula VII $$M^{2+}_{1-x}M^{3+}_{x}(OH)_2(A^{b-})_{x/b} \cdot dH_2O \qquad (VII)$$

wherein $M^{2+}$=one or more of the metals from the group Mg, Ca, Sr, Zn or Sn, $M^{3+}$=Al, or B, $A^n$ is an anion having the valency n, b is a number from 1 to 2, $0 < x \leq 0.5$, and m is a number from 0 to 20.

Preferably, $A^n$=OH$^-$, ClO$_4^-$, HCO$_3^-$, CH$_3$COO$^-$, C$_6$H$_5$COO$^-$, CO$_3^{2-}$, (CHOHCOO)$_2^{2-}$, (CH$_2$COO)$_2^{2-}$, CH$_3$CHOHCOO$^-$, HPO$_3^-$ or HPO$_4^{2-}$ Examples of hydrotalcites are Al$_2$O$_3$.6MgO.CO$_2$.12H$_2$O (i), Mg$_{4.5}$Al$_2$(OH)$_{13}$.CO$_3$.3.5H$_2$O (ii), 4MgO.Al$_2$O$_3$.CO$_2$.9H$_2$O (iii), 4MgO.Al$_2$O$_3$.CO$_2$.6H$_2$O, ZnO.3MgO.Al$_2$O$_3$.CO$_2$.8-9H$_2$O and ZnO.3MgO.Al$_2$O$_3$.CO$_2$.5-6H$_2$O. Special preference is given to types i, ii and iii.

Zeolites (alkali and alkaline earth aluminosilicates)

These can be described by general formula (VIII)

$$M_{x/n}[(AlO_2)_x(SiO_2)_y] \cdot wH_2O \qquad (VIII)$$

wherein n is the charge of the cation M;

M is an element of Group I or Group II, such as Li, Na, K, Mg, Ca, Sr or Ba;

y:x is a number from 0.8 to 15, preferably from 0.8 to 1.2; and w is a number from 0 to 300, preferably from 0.5 to 30.

Examples of zeolites are sodium aluminosilicates of the formulae $Na_{12}Al_{12}Si_{12}O_{48} \cdot 27\ H_2O$ [zeolite A], $Na_6Al_6Si_6O_{24} \cdot 2\ NaX$. 7.5 $H_2O$, X=OH, halogen, $ClO_4$ [sodalite]; $Na_6Al_6Si_{30}O_{72} \cdot 24\ H_2O$; $Na_8Al_8Si_{40}O_{96} \cdot 24\ H_2O$; $Na_{16}Al_{16}Si_{24}O_{80} \cdot 16\ H_2O$; $Na_{16}Al_{16}Si_{32}O_{96} \cdot 16\ H_2O$; $Na_{56}Al_{56}Si_{136}O_{384} \cdot 250\ H_2O$ [zeolite Y], $Na_{86}Al_{86}Si_{106}O_{384} \cdot 264\ H_2O$ [zeolite X];

or the zeolites that can be formed by partial or complete replacement of the Na atoms by Li, K, Mg, Ca, Sr or Zn atoms, such as $(Na,K)_{10}Al_{10}Si_{22}O_{64} \cdot 20\ H_2O$; $Ca_{4.5}Na_3[(AlO_2)_{12}(SiO_2)_{12}] \cdot 30\ H_2O$; $K_9Na_3[(AlO_2)_{12}(SiO_2)_{12}] \cdot 27\ H_2O$.

Preferred zeolites correspond to the formulae
$Na_{12}Al_{12}Si_{12}O_{48} \cdot 27\ H_2O$ [zeolite A],
$Na_6Al_6Si_6O_{24} \cdot 2NaX$. 7.5 $H_2O$, X=OH, Cl, $ClO_4$, ½$CO_3$ [sodalite]
$Na_6Al_6Si_{30}O_{72} \cdot 24\ H_2O$,
$Na_8Al_8Si_{40}O_{96} \cdot 24\ H_2O$,
$Na_{16}Al_{16}Si_{24}O_{80} \cdot 16\ H_2O$,
$Na_{16}Al_{16}Si_{32}O_{96} \cdot 16\ H_2O$,
$Na_{56}Al_{56}Si_{136}O_{384} \cdot 250\ H_2O$ [zeolite Y]
$Na_{86}Al_{86}Si_{106}O_{384} \cdot 264\ H_2O$ [zeolite X]

and zeolites of the X od Y type possessing an Al/Si ratio of about 1:1, or the zeolites that can be formed by partial or complete replacement of the Na atoms by Li, K, Mg, Ca, Sr, Ba or Zn atoms, such as
$(Na,K)_{10}Al_{10}Si_{22}O_{64} \cdot 20\ H_2O$
$Ca_{4.5}Na_3[(AlO_2)_{12}(SiO_2)_{12}] \cdot 30\ H_2O$
$K_9Na_3[(AlO_2)_{12}(SiO_2)_{12}] \cdot 27\ H_2O$ The zeolites listed may also have a lower water content or may be anhydrous. Other suitable zeolites are:
$Na_2O \cdot Al_2O_3 \cdot (2\ to\ 5)\ SiO_2 \cdot (3.5\ to\ 10)\ H_2O$ [zeolite P]
$Na_2O \cdot Al_2O_3 \cdot 2\ SiO_2 \cdot (3.5-10)H_2O$ (zeolite MAP)

or the zeolites that can be formed by partial or complete replacement of the Na atoms by Li, K or H atoms, such as
$(Li,Na,K,H)_{10}Al_{10}Si_{22}O_{64} \cdot 20\ H_2O$
$K_9Na_3[(AlO_2)_{12}(SiO_2)_{12}] \cdot 27\ H_2O$
$K_4Al_4Si_4O_{16} \cdot 6\ H_2O$ [zeolite K-F]

$Na_8Al_8Si_{40}O_{96} \cdot 24\ H_2O$ zeolite D, as described in Barrer et al., J. Chem. Soc. 1952, 1561–1571, and in U.S. Pat. No. 2,950,952;

The following zeolites are also suitable:
potassium offretite, as described in EP-A-400 961;
zeolite R, as described in GB 841 812;
zeolite LZ-217, as described in U.S. Pat. No. 4,503,023;
Ca-free zeolite LZ-218, as described in U.S. Pat. No. 4,333,859;
zeolite T, zeolite LZ-220, as described in U.S. Pat. No. 4,503,023;
$Na_3K_6Al_9Si_{27}O_{72} \cdot 21\ H_2O$ [zeolite L];
zeolite LZ-211, as described in U.S. Pat. No. 4,503,023;
zeolite LZ-212, as described in U.S. Pat. No. 4,503,023;
zeolite O, zeolite LZ-217, as described in U.S. Pat. No. 4,503,023;
zeolite LZ-219, as described in U.S. Pat. No. 4,503,023;
zeolite Rho, zeolite LZ-214, as described in U.S. Pat. No. 4,503,023;
zeolite ZK-19, as described in Am. Mineral. 54 1607 (1969);
zeolite W (K-M), as described in Barrer et al., J. Chem. Soc. 1956, 2882;
$Na_{30}Al_{30}Si_{66}O_{192} \cdot 98\ H_2O$ [zeolite ZK-5, zeolite Q].

Special preference is given to the use of zeolite P types of formula I wherein x is from 2 to 5 and y is from 3.5 to 10, especially zeolite MAP of formula I wherein x is 2 and y is from 3.5 to 10, and very especially zeolite Na-P, that is to say M is Na. That zeolite generally occurs in variants Na-P-1, Na-P-2 and Na-P-3, which are differentiated by their cubic, tetragonal or orthorhombic structure (R. M. Barrer, B. M. Munday, J.Chem.Soc. A 1971, 2909–2914). The literature just mentioned also describes the preparation of zeolite P-1 and P-2. According to that publication, zeolite P-3 is very rare and is therefore of little practical interest. The structure of zeolite P-1 corresponds to the gismondite structure known from the above-mentioned Atlas of Zeolite Structures. In more recent literature (EP-A 384 070) a distinction is made between cubic (zeolite B or $P_c$) and tetragonal (zeolite $P_1$) zeolites of the P type. That publication also mentions relatively new zeolites of the P type having Si:Al ratios of less than 1.07:1. Those are zeolites designated MAP or MA-P for "Maximum Aluminium P". Depending upon the preparation process, zeolite P may contain small quantities of other zeolites. Very pure zeolite P has been described in WO 94/26662.

Within the scope of the invention it is also possible to use finely particulate, water-insoluble sodium aluminosilicates which have been precipitated and crystallised in the presence of water-soluble inorganic or organic dispersants. Those compounds can be introduced into the reaction mixture in any desired manner before or during the precipitation and/or the crystallisation.

Sodium zeolite A and sodium zeolite P are very especially preferred.

The hydrotalcites and/or zeolites can be used in amounts of, for example, from 0.1 to 20, advantageously from 0.1 to 10, and especially from 0.1 to 5, parts by weight, based on 100 parts by weight of halogen-containing polymer.

Alkali aluminocarbonates (dawsonites)

These are compounds of the formula
$\{(M_2O)_m \cdot (Al_2O_3)_n \cdot Z_o \cdot pH_2O\}$,
wherein M is H, Li, Na, K, $Mg_{1/2}$, $Ca_{1/2}$, $Sr_{1/2}$ or $Zn_{1/2}$; Z is $CO_2$, $SO_2$, $(Cl_2O_7)_{1/2}$, $B_4O_6$, $S_2O_2$ (thiosulfate) or $C_2O_2$ (oxalate): m is a number from 1 to 2 when M is $Mg_{1/2}$ or $Ca_{1/2}$, and in all other cases is a number from 1 to 3; n is a number from 1 to 4; o is a number from 2 to 4; and p is a number from 0 to 30.

The alumino salt compounds of formula (I) that can be used according to the invention may be naturally occurring minerals or synthetically prepared compounds. The metals may partially replace one another. The mentioned alumino salt compounds are crystalline, partially crystalline or amorphous or may be present in the form of a dried gel. The alumino salt compounds may also be present in relatively rare crystalline modifications. A process for the preparation of such compounds is described in EP 394 670. Examples of naturally occurring alumino salt compounds are indigirite, tunisite, aluminohydrocalcite, para-aluminohydrocalcite, strontiodresserite and hydrostrontiodresserite. Other examples of alumino salt compounds are potassium aluminocarbonate $\{(K_2O).(Al_2O_3).(CO_2)_2.2H_2O\}$, sodium aluminothiosulfate $\{(Na_2O).(Al_2O_3).(S_2O_2)_2.2H_2O\}$, potassium aluminosulfite $\{(K_2O).(Al_2O_3).(SO_2)_2.2H_2O\}$, calcium aluminooxalate $\{(CaO).(Al_2O_3).(C_2O_2)_2.5H_2O\}$, magnesium aluminotetraborate $\{(MgO).(Al_2O_3).(B_4O_6)_2.5H_2O\}$, $\{([Mg_{0.2}Na_{0.6}]_2O).(Al_2O_3).(CO_2)_2.4.1H_2O\}$, $\{([Mg_{0.2}Na_{0.6}]_2O).(Al_2O_3).(CO_2)_2.4.3H_2O\}$ and $\{([Mg_{0.3}Na_{0.4}]_2O).(Al_2O_3).(CO_2)_{2.2}.4.9H_2O\}$.

The mixed alumino salt compounds can be obtained in accordance with processes known per se by cation exchange, preferably from the alkali alumino salt compounds or by combined precipitation (see, for example, U.S. Pat. No. 5,055,284).

Preference is given to alumino salt compounds of the above formula wherein

M is Na or K; Z is $CO_2$, $SO_2$ or $(Cl_2O_7)_{1/2}$; m is 1–3; n is 1–4; o is 2–4 and p is 0–20. Z is especially $CO_2$.

Preference is given also to compounds that can be represented by the following formulae:

$M_2O.Al_2O_3.(CO_2)_2. pH_2O$     (Ia)

$(M_2O)_2.(Al_2O_3)_2.(CO_2)2.pH_2O$     (Ib)

$M_2O.(Al_2O_3)_2.(CO_2)_2.pH_2O$     (Ic)

wherein M is a metal, such as Na, K, $Mg_{1/2}$, $Ca_{1/2}$, $Sr_{1/2}$ or $Zn_{1/2}$ and p is a number from 0 to 12.

Special preference is given to sodium aluminodihydroxycarbonate (DASC) and to the homologous potassium compound (DAPC).

Dawsonites may also be substituted by lithium-alumohydroxycarbonates or lithium-magnesium-alumohydroxycarbonates, as described in EP 549,340 and DE 4,425,266.

The dawsonites can be used in an amount of, for example, from 0.01 to 5, advantageously from 0.1 to 3, especially from 0.1 to 2, parts by weight, based on 100 parts by weight of halogen-containing polymer.

The stabiliser combination preferably comprises component A) and, as component B), at least one substance from the following groups: perchlorate compounds, glycidyl compounds, or dihydropyridines and polydihydropyridines.

The stabiliser combination according to the invention can be used together with further additives that are customary for the processing and stabilisation of chlorine-containing polymers, such as:

Zinc compounds

The organic zinc compounds having a Zn-O bond are zinc enolates and/or zinc carboxylates. The latter are, for example, compounds from the series of aliphatic saturated $C_2$–$C_{22}$ carboxylates, aliphatic unsaturated $C_3$–$C_{22}$ carboxylates, aliphatic $C_2$–$C_{22}$ carboxylates that are substituted by at least one OH group or the chain of which is interrupted at least by one oxygen atom (oxa acids), cyclic and bicyclic carboxylates having from 5 to 22 carbon atoms, phenylcarboxylates that are unsubstituted, substituted by at least one OH group and/or $C_1$–$C_{16}$alkyl-substituted, phenyl-$C_1$–$C_{16}$alkylcarboxylates, or phenolates that are unsubstituted or $C_1$–$C_{12}$alkyl-substituted, or abietic acid.

There may be mentioned specifically, as examples, the zinc salts of monovalent carboxylic acids, such as acetic acid, propionic acid, butyric acid, valeric acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, lauric acid, isostearic acid, stearic acid, 12-hydroxystearic acid, 9,10-dihydroxystearic acid, oleic acid, 3,6-dioxaheptanoic acid, 3,6,9-trioxadecanoic acid, behenic acid, benzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, and sorbic acid: zinc salts of divalent carboxylic acids or the monoesters thereof, such as oxalic acid, malonic acid, succinic acid, glutaric acid, adipic acid, fumaric acid, pentane-1,5dicarboxylic acid, hexane-1,6-dicarboxylic acid, heptane-1,7-dicarboxylic acid, octane-1,8-dicarboxylic acid, 3,6,9-trioxadecane-1,10-dicarboxylic acid, lactic acid, malonic acid, maleic acid, tartaric acid, cinnamic acid, mandelic acid, malic acid, glycolic acid, oxalic acid, salicylic acid, polyglycol-dicarboxylic acid (n=10–12), phthalic acid, isophthalic acid, terephthalic acid and hydroxyphthalic acid; and the di- or tri-esters of tri- or tetra-valent carboxylic acids, such as hemimellitic acid, trimellitic acid, pyromellitic acid, citric acid and also so-called overbased zinc carboxylates.

The zinc enolates are preferably enolates of acetylacetone, benzoylacetone or dibenzoylmethane and enolates of acetoacetates and benzoyl acetates and of dehydroacetic acid. In addition, inorganic zinc compounds, such as zinc oxide, zinc hydroxide, zinc sulfide or zinc carbonate, can also be used.

Preference is given to zinc carboxylates of a carboxylic acid having from 7 to 25 carbon atoms (zinc soaps), such as benzoates or alkanoates, preferably $C_8$alkanoates, stearate, oleate, laurate, palmitate, behenate, versatate, hydroxystearates, dihydroxystearates, p-tert-butylbenzoate, or (iso)octanoate. Preference is given especially to stearate, oleate, versatate, benzoate, p-tert-butylbenzoate and 2-ethylhexanoate.

Also suitable in addition to the mentioned zinc compounds are organic aluminium, cerium or lanthanum compounds having a metal-O bond. The aluminium compounds that can be used and that are preferred include carboxylates and enolates.

The metal soaps described and mixtures thereof can be used in amounts of, for example, from 0.001 to 10, advantageously from 0.01 to 5, preferably from 0.01 to 3, parts by weight, based on 100 parts by weight of chlorine-containing polymer.

The stabiliser combination can be provided with further stabilisers, auxiliaries and processing agents, such as alkali metal and alkaline earth metal compounds, glidants, plasticisers, pigments, fillers, phosphites, thiophosphites and thiophosphates, mercaptocarboxylic acid esters, epoxidised fatty acid esters, antioxidants, UV absorbers and light stabilisers, optical brighteners, impact strength modifiers and processing aids, gelling agents, antistatic agents, biocides, metal deactivators, fireproofing agents and propellants, and antifogging agents (cf. "Handbook of PVC Formulating" by E. J. Wickson, John Wiley & Sons, New York 1993).

In a non-limiting manner, some of the known additives and processing auxiliaries are mentioned here:

Alkali metal and alkaline earth metal compounds.

These are to be understood to include especially the carboxylates of the acids described above, but also corresponding oxides or hydroxides or (bi)carbonates. Mixtures thereof with organic acids are also suitable. Examples are NaOH, Na-stearate, $NaHCO_3$, KOH, K-stearate, $KHCO_3$, LiOH, $Li_2CO_3$, Li-stearate, CaO, $Ca(OH)_2$, MgO, $Mg(OH)_2$, Mg-stearate, $CaCO_3$, $MgCO_3$ as well as dolomite, huntit, chalk, basic Mg-carbonate and other Na- and K-salts of fatty acids.

NaOH, KOH, CaO, Ca(OH$_2$), MgO, Mg(OH)$_2$, CaCO$_3$ and MgCO$_3$ and also fatty acid sodium and potassium salts.

In the case of alkaline earth metal and zinc carboxylates, it is also possible for their adducts with MO or M(OH)$_2$ (M=Ca, Mg, Sr or Zn), so-called "overbased" compounds, to be used.

Preference is given to alkali metal, alkaline earth metal and/or aluminium carboxylates in addition to the stabiliser combination according to the invention.

Other Metal Stabilisers

Special metnion has to be made of organotin stabilisers, carboxylates, mercaptides and Sulfides being preferred. Examples of suitable compounds may be found in U.S. Pat. No. 4,743,640.

Glidants(LUBRICANTS)

Suitable glidants are, for example:

Montan wax, fatty acid esters, PE waxes, amide waxes, chloroparaffins, glycerol esters or alkaline earth metal soaps. Suitable glidants are also described in "Kunststoffadditive" (Plastics additives), R. Gächter/H. Muller, Carl Hanser Verlag, 3$^{rd}$ Ed., 1989, pages 478–488. Mention may also be made of fatty ketones (as described in DE 42 04 887) and of silicone-based glidants (as described in EP 225 261) or combinations thereof, as listed in EP 259 783.

Plasticisers

Suitable organic plasticisers are, for example, those of the following groups:

A) Phthalic acid esters:

Examples of such plasticisers are dimethyl, diethyl, dibutyl, dihexyl, di-2ethylhexyl, di-n-octyl, diisooctyl, diisononyl, diisodecyl, diisotridecyl, dicyclohexyl, dimethylcyclohexyl, dimethylglycol, dibutylglycol, benzylbutyl and diphenyl phthalate and mixtures of phthalates, such as C$_7$–C$_9$- and C$_9$–C$_{11}$-alkyl phthalates from predominantly linear alcohols, C$_6$–C$_{10}$-n-alkyl phthalates and C$_8$–C$_{10}$-n-alkyl phthalates. Of those compounds, preference is given to dibutyl, dihexyl, di-2-ethylhexyl, di-n-octyl, diisooctyl, diisononyl, diisodecyl, diisotridecyl and benzylbutyl phthalate and to the mentioned mixtures of alkyl phthalates. Special preference is given to di-2-ethylhexyl, diisononyl and diisodecyl phthalate, which are also known by the customary abbreviations DOP (dioctyl phthalate, di-2-ethylhexyl phthalate), DINP (diisononyl phthalate), DIDP (diisodecyl phthalate).

B) Esters of aliphatic dicarboxylic acids, especially esters of adipic, azelaic and sebacic acid:

Examples of such plasticisers are di-2-ethylhexyl adipate, diisooctyl adipate (mixture), diisononyl adipate (mixture), diisodecyl adipate (mixture), benzylbutyl adipate, benzyloctyl adipate, di-2-ethylhexyl azelate, di-2ethylhexyl sebacate and diisodecyl sebacate (mixture). Di-2-ethylhexyl adipate and diisooctyl adipate are preferred.

C) Trimellitic acid esters, for example tri-2-ethylhexyl trimellitate, triisodecyl trimellitate (mixture), triisotridecyl trimellitate, triisooctyl trimellitate (mixture) and tri-C$_6$–C$_8$alkyl, tri-C$_6$–C$_{10}$alkyl, tri-C$_7$–C$_9$alkyl and tri-C$_9$–C$_{11}$alkyl trimellitate. The last-mentioned trimellitates are formed by esterifying trimellitic acid with the appropriate alkanol mixtures. Preferred trimellitates are tri-2-ethylhexyl trimellitate and the mentioned trimellitates from alkanol mixtures. Customary abbreviations are TOTM (trioctyl trimellitate, tri-2-ethylhexyl trimellitate), TIDTM (triisodecyl trimellitate) and TIDTM (triisotridecyl trimellitate).

D) Epoxide plasticisers

These are mainly epoxidised unsaturated fatty acids, such as epoxidised soybean oil.

E) Polymer plasticisers

A definition of these plasticisers and examples thereof are given in "Kunststoffadditive" (Plastics additives), R. G achter/H. Müller, Carl Hanser Verlag, 3$^{rd}$ Ed., 1989, Chapter 5.9.6, pages 412–415, and in "PVC Technology", W. V. Titow, 4$^{th}$ Ed., Elsevier Publ., 1984, pages 165–170. The most commonly used starting materials for the preparation of polyester plasticisers are: dicarboxylic acids, such as adipic, phthalic, azelaic and sebacic acid; diols, such as 1,2-propanediol, 1,3-butanediol, 1,4-butanediol, 1,6-hexanediol, neopentyl glycol and diethylene glycol.

F) Phosphoric acid esters

A definition of those esters is to be found in the above-mentioned "Taschenbuch der Kunstoffadditive" (Handbook of Plastics Additives), Chapter 5.9.5, p.p. 408–412. Examples of such phosphoric acid esters are tributyl phosphate, tri-2-ethylbutyl phosphate, tri-2-ethylhexyl phosphate, trichloroethyl phosphate, 2-ethyl-hexyl-diphenyl phosphate, cresyl diphenyl phosphate, triphenyl phosphate, tricresyl phosphate and trixylenyl phosphate. Tri-2-ethylhexyl phosphate and ™Reofos 50 and 95 (Ciba-Geigy) are preferred.

G) Chlorinated hydrocarbons (paraffins)

H) Hydrocarbons

I) Monoesters, e.g. butyl oleate, phenoxyethyl oleate, tetrahydrofurfuryl oleate and alkylsulfonic acid esters.

J) Glycol esters, e.g. diglycol benzoates.

Definitions and examples of plasticisers of groups G) to J) are to be found in the following handbooks:

"Kunststoffadditive" (Plastics Additives), R. Gächter/H. Müller, Carl Hanser Verlag, 3$^{rd}$ Ed., 1989, Chapter 5.9.14.2, p.p. 422–425 (group G), and Chapter 5.9.14.1, p. 422 (group H).

"PVC Technology", W. V. Titow, 4$^{th}$ Ed., Elsevier Publishers, 1984, Chapter 6.10.2, pages 171–173, (group G), Chapter 6.10.5, page 174 (group H), Chapter 6.10.3, page 173, (group I) and Chapter 6.10.4, pages 173–174 (group J).

It is also possible to use mixtures of different plasticisers.

The plasticisers can be used in an amount of, for example, from 5 to 120, advantageously from 10 to 100, and especially from 20 to 70, parts by weight, based on 100 parts by weight PVC.

Pigments

Suitable substances are known to the person skilled in the art. Examples of inorganic pigments are TiO$_2$, carbon black, Fe$_2$O$_3$, Sb$_2$O$_3$, (Ti,Ba,Sb)O$_2$,Cr$_2$O$_3$, spinels, such as cobalt blue and cobalt green, Cd(S,Se), ultramarine blue. Organic pigments are, for example, azo pigments, phthalocyanine pigments, quinacridone pigments, perylene pigments, diketo-pyrrolopyrrole pigments and anthraquinone pigments. Preference is also given to TiO$_2$ in micronised form.

Definitions and further descriptions are to be found in the "Handbook of PVC Formulating", E. J. Wickson, John Wiley & Sons, New York 1993.

Fillers

Fillers (HANDBOOK OF PVC FORMULATING, E. J. Wickson John Wiley & Sons, Inc., 1993 pp. 393–449) and reinforcing agents (TASCHENBUCH der KA'e (HANDBOOK of Plastics Additives), R. Gächter & H. M üller, Carl Hanser, 1990, pp. 549–615) (such as calcium carbonate, dolomite, wollastonite, magnesium oxide, magnesium hydroxide, silicates, glass fibres, talc, kaolin, chalk, mica, metal oxides and hydroxides, carbon black or graphite). Chalk is preferred.

Phosphites

Examples are triphenyl phosphite, diphenyl alkyl phosphites, phenyl dialkyl phosphites, tris-(nonylphenyl)

phosphite, trilauryl phosphite, trioctadecyl phosphite, distearyl-pentaerythritol diphosphite, tris(2,4-di-tert-butylphenyl) phosphite, diisodecylpentaerythritol diphosphite, bis(2,4-di-tert-butylphenyl)pentaerythritol diphosphite, bis(2,6-di-tert-butyl-4-methylphenyl)-pentaerythritol diphosphite, bis-isodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl-sorbitol triphosphite, bis(2,4-di-tert-butyl-6-methylphenyl)methyl phosphite, bis (2,4-di-tert-butyl-6methylphenyl)ethyl phosphite.

Especially suitable are trioctyl, tridecyl, tridodecyl, tritetradecyl, tristearyl, trioleyl, triphenyl-, tricresyl, tris-p-nonylphenyl or tricyclohexyl phosphite and special preference is given to the aryl-dialkyl and alkyl-diaryl phosphites, such as phenyldidecyl phosphite, (2,4-di-tert-butylphenyl)-di-dodecyl phosphite, (2,6di-tert-butylphenyl)-di-dodecyl phosphite and to the dialkyl- and diaryl-pentaerythritol diphosphites, such as distearylpentaerythritol diphosphite, and non-stoichiometric triaryl phosphites, for example those having the composition $(H_{19}C_9—C_6H_4)O_{1.5}P(OC_{12.13}H_{25.27})_{1.5}$.

Preferred organic phosphites are distearyl-pentaerythritol diphosphite, trisnonylphenyl phosphite and phenyldidecyl phosphite.

The organic phosphites can be used in an amount of, for example, from 0.01 to 10, advantageously from 0.05 to 5, and especially from 0.1 to 3, parts by weight, based on 100 parts by weight PVC.

Thiophosphites and thiophosphates

There are to be understood by thiophosphites and thio-phosphates compounds of the general type:

$(RS)_3P$, $(RS)_3P=O$ or $(RS)_3P=S$, which are described in patent specifications DE 28 09 492, EP 090 770 and EP 573 394.

Examples of those compounds are: trithiohexyl phosphite, trithiooctyl phosphite, trithiolauryl phosphite, trithiobenzyl phosphite, trithiophosphorous acid tris(carboisooctyloxy) methyl ester, trithiophosphorous acid tris (carbotrimethylcyclohexyloxy)methyl ester, trithiophosphoric acid S,S,S-tris(carboisooctyloxy)methyl ester, trithiophosphoric acid S,S,S-tris(carbo-2-ethylhexyloxy) methyl ester, trithiophosphoric acid S,S,S-tris-1-(carbohexyloxy)-ethyl ester, trithiophosphoric acid S,S,S-tris-1-(carbo-2ethylhexyloxy)-ethyl ester, trithiophosphoric acid S,S,S-tris-2-(carbo-2ethylhexyloxy)-ethyl ester.

Mercaptocarboxylic acid esters

Examples of these compounds are: esters of the thiogly-colic acid, thiomalic acid, mercaptopropionic acid, mercap-tobenzoic acids or thiolactic acid that are described in patents FR 2 459 816, EP 90 748, FR 2 552 440 and EP 365 483. The mentioned mercaptocarboxylic acid esters also include polyol esters and the partial esters thereof.

Epoxidised fatty acid esters

The stabiliser combination according to the invention may additionally comprise preferably at least one epoxidised fatty acid ester. Especially suitable are esters of fatty acids from natural sources (fatty acid glycerides), such as soya oil or rape oil. It is, however, also possible to use synthetic products, such as epoxidised butyl oleate.

Antioxidants

Suitable antioxidants are, for example:

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol, 2,4-dimethyl-6-(1'-methyl-undec-1'-yl)phenol, 2,4-dimethyl-6-(1'-methyl-heptadec-1'-yl)phenol, 2,4-dimethyl-6-(1'-methyl-tridec-1'-yl)phenol, octylphenol, nonylphenol, dodecylphenol and mixtures thereof.

2. Alkylthiomethylphenols, for example 2,4-di-octylthiomethyl-6-tert-butylphenol, 2,4-di-octylthiomethyl-6-methylphenol, 2,4-di-octylthiomethyl-6-ethylphenol, 2,6-di-dodecylthiomethyl-4-nonylphenol.

3. Alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenylstearate, bis(3,5-di-tert-butyl-4-hydroxyphenyl) adipate.

4. Hydroxylated thiodiphenyl ethers, for example 2,2'-thio-bis(6-tert-butyl-4-methylphenol), 2,2'-thio-bis(4-octylphenol), 4,4'-thio-bis(6-tert-butyl-3-methylphenol), 4,4'-thio-bis(6-tert-butyl-2-methylphenol), 4,4'-thio-bis(3,6-di-sec-amylphenol), 4,4'-bis(2,6-dimethyl-4-hydroxyphenyl) disulfide.

5. Alkylidene bisphenols, for example 2,2'-methylene-bis (6-tert-butyl-4-methylphenol), 2,2'-methylene-bis(6-tert-butyl-4-ethylphenol), 2,2'-methylene-bis[4-methyl-6-(a methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(a-methylbenzyl)-4-nonylphenol], 2,2'-methylene-bis[6-(a,a-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol-bis[3,3-bis(3'-tert-butyl-4'-hydroxyphenyl) butyrate], bis(3-tert-butyl-4-hydroxy-5-methylphenyl) dicyclopentadiene, bis[2-(3'-tert-butyl-2'-hydroxy-5'-methyl-benzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

6. Benzyl compounds, for example 3,5,3',5'-tetra-tert-butyl-4,4'-dihydroxydibenzyl ether, octadecyl-4-hydroxy-3, 5-dimethylbenzyl mercaptoacetate, tris(3,5-di-tert-butyl-4-hydroxybenzyl)amine, bis(4-tert-butyl- 3-hydroxy-2,6-dimethylbenzyl) dithioterephthalate, bis(3,5-di-tert-butyl-4-hydroxybenzyl) sulfide, isooctyl-3,5-di-tert-butyl-4-hydroxybenzyl mercaptoacetate.

7. Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl) malonate, didodecylmercaptoethyl-2,2-bis(3, 5-di-tert-butyl-4-hydroxybenzyl) malonate, di-[4-(1,1,3,3-tetramethylbutyl)phenyl]-2,2-bis(3,5-di-tert-butyl-4-hydroxybenzyl) malonate.

8. Hydroxybenzyl aromatic compounds, for example 1,3, 5-tris(3,5-di-tert-butyl-4-hydroxybenzyl)-2,4,6-trimethylbenzene, 1,4-bis(3,5-di-tert-butyl-4- hydroxybenzyl)-2,3,5,6-tetramethylbenzene, 2,4,6-tris(3,5-di-tert-butyl-4-hydroxybenzyl)phenol.

9. Triazine compounds, for example 2,4-bis-octylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

10. Phosphonates and phosphonites, for example dimethyl-2,5-di-tert-butyl-4-hydroxybenzyl phosphonate, diethyl-3,5-di-tert-butyl-4-hydroxybenzyl phosphonate, dioctadecyl-3,5-di-tert-butyl-4-hydroxybenzyl phosphonate, dioctadecyl-5-tert-butyl-4-hydroxy-3-methylbenzyl phosphonate, calcium salt of 3,5-di-tert-butyl-4-hydroxybenzylphosphonic acid monoethyl ester, tetrakis (2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocine, 6-fluoro-2,4,8,10-tetra-tert-butyl-12-methyl-dibenzo[d,g]-1,3,2-dioxaphosphocine.

11. Acylaminophenols, for example 4-hydroxy-lauric acid anilide, 4-hydroxystearic acid anilide, N-(3,5-di-tert-butyl-4-hydroxyphenyl)-carbamic acid octyl ester.

12. Esters of b-(3,5-di-tert-butyl-4-hydroxyphenyl)-propionic acid with mono- or poly-hydric alcohols, such as methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, dipentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, di-trimethylolpropane, 4hydroxymethyl-1-phospha-2,6,7-trioxabicyclo[2.2.2]octane.

13. Esters of b-(5-tert-butyl-4-hydroxy-3-methylphenyl)-propionic acid with mono- or poly-hydric alcohols, such as methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

14. Esters of b-(3,5-dicyclohexyl-4-hydroxyphenyl)-propionic acid with mono- or poly-hydric alcohols, such as methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

15. Esters of 3,5-di-tert-butyl-4-hydroxyphenylacetic acid with mono- or poly-hydric alcohols, such as methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

16. Amides of b-(3,5-di-tert-butyl-4-hydroxyphenyl)-propionic acid, such as N,N'-bis(3,5-di-tert-butyl-4-hydroxyphenylpropionyl)hexamethylenediamine, N,N'-bis(3,5-di-tert-butyl-4 -hydroxyphenylpropionyl) trimethylenediamine, N,N'-bis(3,5-di-tert-butyl-4-hydroxyphenylpropionyl) hydrazine.

Preference is given to antioxidants of groups 1 to 5, 10 and 12, especially 2,2bis(4-hydroxyphenyl)propane, esters of 3,5-di-tert-butyl-4-hydroxyphenylpropionic acid with octanol, octadecanol or pentaerythritol or tris(2,4-di-tert-butylphenyl) phosphite.

Where appropriate, it is also possible to use a mixture of antioxidants having different structures.

The antioxidants can be used in an amount of, for example, from 0.01 to 10, advantageously from 0.1 to 10, and especially from 0.1 to 5, parts by weight, based on 100 parts by weight PVC.

UV absorbers and light stabilisers

Examples are:

1. 2-(2'-Hydroxyphenyl)-benzotriazoles, such as 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)phenyl)-benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)-benzotriazole, 2-(2'-hydroxy-4'-octoxyphenyl)-benzotriazole, 2-( 3',5'-di-tert-amyl-2'-hydroxyphenyl)-benzotriazole, 2-(3',5'-bis(a,a-dimethylbenzyl)-2'-hydroxyphenyl)-benzotriazole, a mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyloxy) carbonylethyl]-2'-hydroxyphenyl) benzotriazole, 2-(3'-dodecyl-2'-hydroxy-5'-methylphenyl)-benzotriazole, and 2-(3'-tert-butyl-2'-hydroxy-5'-(2-isooctyloxycarbonylethyl) phenyl-benzotriazole, 2,2'-methylene-bis[4-(1,1,3,3-tetramethylbutyl)-6 -benzotriazol-2-ylphenol]; the transesterification product of 2-[3'-tert-butyl-5'-(2-methoxycarbonylethyl)-2'-hydroxy-phenyl]-benzotriazole with polyethylene glycol 300; wherein R=3'-tert-butyl-4'-hydroxy-5'-2 H-benzotriazol-2-ylphenyl.

2. 2-Hydroxybenzophenones, such as the 4-hydroxy-, 4-methoxy-, 4-octyloxy-, 4-decyloxy-, 4-dodecyloxy-, 4-benzyloxy-, 4,2',4'-trihydroxy- or 2'-hydroxy-4,4'-dimethoxy derivative.

3. Esters of unsubstituted or substituted benzoic acids, such as 4-tert-butyl-phenyl salicylate, phenyl salicylate, octylphenyl salicylate, dibenzoylresorcinol, bis(4-tert-butylbenzoyl)resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

4. Acrylates, such as a-cyano-b,b-diphenylacrylic acid ethyl ester or isooctyl ester, a-carbomethoxy-cinnamic acid methyl ester, a-cyano-b-methyl-p-methoxy-cinnamic acid methyl ester or butyl ester, a-carbomethoxy-p-methoxy-cinnamic acid methyl ester, N-(b-carbomethoxy-b-cyanovinyl)-2-methyl-indoline.

5. Nickel compounds, such as nickel complexes of 2,2'-thio-bis[4-(1,1,3,3-tetramethylbutyl)phenol], such as the 1:1 or the 1:2 complex, where appropriate with additional ligands, such as n-butylamine, triethanolamine or N-cyclohexyl diethanolamine, nickel dibutyl dithiocarbamate, nickel salts of 4-hydroxy-3,5-di-tert-butylbenzylphosphonic acid monoalkyl esters, such as methyl or ethyl ester, nickel complexes of ketoximines, such as 2-hydroxy-4-methylphenyl-undecylketoxime, nickel complexes of 1-phenyl-4-lauroyl-5-hydroxy-pyrazole, where appropriate with additional ligands.

6. Sterically hindered amines, such as bis(2,2,6,6-tetramethyl-piperidyl) sebacate, bis(2,2,6,6-tetramethyl-piperidyl) succinate, bis(1,2,2,6,6-pentamethylpiperidyl) sebacate, n-butyl-3,5-di-tert-butyl-4-hydroxybenzyl-malonic acid bis(1,2,2,6,6-pentamethylpiperidyl) ester, the condensation product of 1-hydroxyethyl-2,2,6,6-tetramethyl-4-hydroxypiperidine and succinic acid, the condensation product of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl)-1,2,3,4-butane tetraoate, 1,1'-(1,2-ethanediyl)-bis(3,3,5,5-tetramethyl-piperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the condensation product of N,N'-bis(2,2,6,6-tetramethyl-4-piperidyl)-hexamethylenediamine and 4-morpholino-2,6-dichloro-1,3,5-triazine, the condensation product of 2-chloro-4,6-di(4-n-butylamino-2,2,6,6-tetramethylpiperidyl)-1,3,5-triazine and 1,2-bis(3-aminopropylamino)ethane, the condensation product of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)-pyrrolidine-2,5-dione, and Chimassorb 966.

7. Oxalic acid diamides, such as 4,4'-di-octyloxy-oxanilide, 2,2'-di-octyloxy-5,5'-di-tert-butyl oxanilide, 2,2'-didodecyloxy-5,5'-di-tert-butyl oxanilide, 2-ethoxy-2'-ethyl oxanilide, N,N'-bis(3-dimethylaminopropyl) oxalamide, 2-ethoxy-5-tert-butyl-2'-ethyl oxanilide and a mixture thereof with 2-ethoxy-2'-ethyl-5,4'-di-tert-butyl oxanilide, mixtures of o- and p-methoxy- and o- and p-ethoxy-disubstituted oxanilides.

8. 2-(2-Hydroxyphenyl)-1.3.5-triazines, such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxy-propyloxy)phenyl]-4,6-bis(2,4-dimethylphenyl)-1,3,5-triazine, 2-[2-hydroxy-4-(2-hydroxy-3-octyloxypropyloxy)phenyl ]-4,6-bis(2,4-dimethylphenyl)-1,3,5-triazine.

Propellants

Propellants are organic azo and hydrazo compounds, tetrazoles, oxazines, isatoic anhydride, and sodium carbonate and sodium hydrogen carbonate. Preference is given to azodicarbonamide and sodium hydrogen carbonate and mixtures thereof.

Definitions and examples of impact strength modifiers and processing aids, gelling agents, antistatic agents, biocides, metal deactivators, optical brighteners, fire-proofing agents and antifogging agents are described in "Kunststoffadditive" (Plastics Additives), R. Gächter/H. Müller, Carl Hanser Verlag, $3^{rd}$ Ed., 1989, and "Handbook of Polyvinyl Chloride Formulating", E. J. Wilson, J. Wiley & Sons, 1993. Impact strength modifiers are also extensively described in "Impact Modifiers for PVC", J. T. Lutz/D. L. Dunkelberger, John Wiley & Sons, 1992.

The stabiliser combination can be prepared not only by mixing the components in apparatus suitable for the purpose, but also by preparing some of the additional components in situ in a melt of glidants and/or metal soaps before adding component A). That method is suitable especially for the in situ preparation of calcium acetyl acetonate (cf. EP 336 289).

Examples of chlorine-containing polymers to be stabilised or of the recyclates thereof are: polymers of vinyl chloride, vinyl resins containing vinyl chloride units in their structure, such as copolymers of vinyl chloride and vinyl esters of aliphatic acids, especially vinyl acetate, copolymers of vinyl chloride with esters of acrylic and methacrylic acid and with acrylonitrile, copolymers of vinyl chloride with diene compounds and unsaturated dicarboxylic acids or the anhydrides thereof, such as copolymers of vinyl chloride with diethyl maleate, diethyl fumarate or maleic acid anhydride, post-chlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers thereof with vinyl chloride and other polymerisable compounds; polymers of vinyl chloroacetate and dichlorodivinyl ether; chlorinated polymers of vinyl acetate, chlorinated polymeric esters of acrylic acid and alpha-substituted acrylic acid; polymers of chlorinated styrenes, for example dichlorostyrene; chlorinated gum; chlorinated polymers of ethylene, polymers and post-chlorinated polymers of chlorobutadiene and the copolymers thereof with vinyl chloride, gum hydrochloride and chlorinated gum hydrochloride; and mixtures of the mentioned polymers with one another or with other polymerisable compounds.

Also included are the graft polymers of PVC with EVA, ABS and MBS. Preferred substrates are also mixtures of the above-mentioned homo- and copolymers, especially vinyl chloride homopolymers, with other thermoplastic and/or elastomeric polymers, especially blends with ABS, MBS, NBR, SAN, EVA, CPE, MBAS, PMA, PMMA, EPDM and polylactones.

Preference is given also to suspension and bulk polymers, and to emulsion polymers.

Polyvinyl chloride is especially preferred as the chlorine-containing polymer, especially in the form of a suspension polymer and of a bulk polymer.

Within the scope of this invention, PVC is also to be understood to include copolymers or graft polymers of PVC with polymerisable compounds such as acrylonitrile, vinyl acetate or ABS, which may be suspension, bulk or emulsion polymers. Preference is given to PVC homopolymers also in combination with polyacrylates.

Also suitable for stabilisation within the scope of this invention are especially recyclates of chlorine-containing polymers, the polymers being those described in detail above, which have been damaged as a result of processing, use or storage. PVC recyclate is especially preferred. The recyclates may also contain small amounts of foreign substances, such as paper, pigments and adhesives, which are often difficult to remove. Those foreign substances may also originate from contact with various substances during use or working-up, such as propellant residues, traces of lacquer, traces of metal, and initiator radicals.

The invention relates also to a process for stabilising chlorine-containing polymers, which comprises adding to the polymers a stabiliser combination according to claim 1 and homogeneously mixing the components in apparatus suitable for the purpose.

Advantageously, the stabilisers can be incorporated using the following methods:

- in the form of an emulsion or dispersion (one possibility is, for example, as a paste-like mixture). An advantage of the combination according to the invention in the case of that form of introduction is the stability of the paste);
- in the form of a dry mixture during the mixing of additive components or polymer mixtures;
- by direct addition to the processing apparatus (for example a calender, mixer, kneader, extruder or the like) or
- in the form of a solution or melt.

Stabilised PVC according to the invention, to which the invention also relates, can be prepared in a manner known per se, the stabiliser combination according to the invention and, where appropriate, any further additives being mixed with the PVC using apparatus known per se, such as the processing apparatus mentioned above. In that procedure, the stabilisers can be added individually or as mixtures or alternatively in the form of master batches.

The invention thus also relates to a process for the preparation of stabilised PVC, which comprises mixing components (b), (c) and (d) described hereinbefore and, where appropriate, any further additives with the PVC using apparatus, such as calenders, mixers, kneaders, extruders and the like.

PVC stabilised in accordance with the present invention can be brought into the desired form by known methods. Those methods are, for example, grinding, calendering, extrusion, injection moulding, sintering or spinning, also blow extrusion or processing by the plastisol method. The stabilised PVC can also be processed to form foams. When azodicarbonamide is used as propellant it is advantageous not additionally to use 1,3-diketones.

Stabilised PVC according to the invention is suitable, for example, for semirigid and soft formulations, especially as soft formulations for wire sheathing, crash pad sheeting (automobiles) and cable insulation, which is especially preferred. In the form of semirigid formulations, the PVC according to the invention is suitable especially for decorative sheeting, foams, agricultural sheeting, hoses, sealing profiles and office film.

In the form of rigid formulations, the stabilised PVC according to the invention is suitable especially for hollow bodies (bottles), packaging sheets (thermoforming sheets), blown sheets, pipes, foams, heavy-duty profiles (window frames), transparent wall profiles, building profiles, sidings, fittings, office sheeting and equipment housing (for computers, household appliances).

Examples of the use of the PVC according to the invention as plastisol are synthetic leathers, floor coverings, textile coatings, wallpapers, coil coatings and underseal for motor vehicles.

Examples of sintered PVC applications for the stabilised PVC according to the invention are slush, slush mould and coil coatings.

Preference is given to PVC rigid foam mouldings and PVC pipes, such as those for drinking water or waste water, pressure pipes, gas pipes, cable conduits and cable-protection pipes, pipes for industrial pipelines, drain pipes, waste pipes, guttering and drainage pipes. For more detailed information see "Kunststoffhandbuch PVC" (PVC Plastics Handbook), Volume 2/2, W. Becker/H. Braun, $2^{nd}$ Ed., 1985, Carl Hanser Verlag, pages 1236–1277.

The Examples that follow illustrate the invention further without, however, limiting the invention. Unless otherwise indicated, parts and percentages relate to the weight, as in the remainder of the description.

EXAMPLE 1

Static heat test

The mixtures according to the following Tables are each plasticised for 5 minutes at 190° C. and 170° C. in a roll mill. Test strips are cut from the resulting sheets (which are 0.3 mm thick) and subjected to heating in a Mathis Thermo-Takter at 190° C. for the period indicated below in the Tables. Then the Yellowness Index (YI) according to ASTM-1925-70 is determined.

The lower the YI value found, the more effectively the stabiliser system prevents yellowing and thus damage to the material. The long-term thermostability of the stabilised polymer can also be determined from the sudden appearance of discolouration throughout the polymer.

The longer that that discolouration when subjected to heating is delayed, or the lower the initial discolouration and the better the colour maintenance (low mean discolouration), the more effective is the stabiliser.

TABLE I

Static heat test at 190° C. (rolled for 5 min at 190° C.)

| Mixture | I1 | I2 | I3 |
|---|---|---|---|
| Solvic 268 RC (S-PVC K value 68) | 100 | 100 | 100 |
| Omyalite 30 T[1)] | 3.0 | / | / |
| Ca stearate | 0.6 | 0.6 | 0.6 |
| Hostalub H4[2)] | 1.0 | 1.0 | 1.0 |
| Hostalub H12[2a)] | 0.2 | 0.2 | 0.2 |
| CH 300[3)] | 0.4 | 0.4 | 0.4 |
| Mark 6045 ACM[4)] | 0.3 | 0.3 | 0.3 |
| Stabiliser[5)] | 0.2 | 0.2 | 0.2 |
| NaClO$_4$ | / | / | 0.05 |
| | YI | YI | YI |
| Minutes | | | |
| 10 | 20.7 | 29.9 | 22.2 |
| 15 | 28.4 | 66.6 | 29.1 |
| 20 | 40.2 | 108.4 | 39.2 |

[1)]Chalk
[2)]Glidant supplied by Hoechst (paraffin wax)
[2a)]Glidant supplied by Hoechst (polar ethylene wax)
[3)]Phenylisodecyl phosphite
[4)]Mixture of 9% NaClO$_4$, 45% CaCO$_3$, 40% CaSiO$_3$, 6% H$_2$O
[5)]6-Amino-1,3-dimethyl-uracil It is found that the use of small amounts of perchlorate compound as component B in mixtures I1 and I3 according to the invention results in considerably better stabilisation than without component B.

TABLE II

Static heat test at 190° C. (rolled for 5 min at 170° C.)

| Mixture | II1 | II2 | II3 | II4 | II5 | II6 | II7 | II8 | II9 |
|---|---|---|---|---|---|---|---|---|---|
| Evipol SH 6030 (PVC K value 60) | 100 | 100 | 100 | 100 | 100 | 100 | 100 | 100 | 100 |
| CH 300[3] | 0.8 | 0.8 | 0.8 | 0.8 | 0.8 | 0.8 | 0.8 | 0.8 | 0.8 |
| Wax E[6] | 0.4 | 0.4 | 0.4 | 0.4 | 0.4 | 0.4 | 0.4 | 0.4 | 0.4 |
| Epox. soya oil | 5.0 | 5.0 | 5.0 | / | / | / | / | / | / |
| Araldite GY 250[7] | / | / | / | 5.0 | 5.0 | 5.0 | / | / | / |
| Araldite PT 810[8] | / | / | / | / | / | / | 5.0 | 5.0 | 5.0 |
| Stabiliser 1[5] | 1.0 | / | / | 1.0 | / | / | 1.0 | / | / |
| Stabiliser 2[9] | / | 1.0 | / | / | 1.0 | / | / | 1.0 | / |
| Stabiliser 3[10] | / | / | 1.0 | / | / | 1.0 | / | / | 1.0 |
| Minutes | YI | YI | YI | YI | YI | YI | YI | YI | YI |
| 20 | 17.4 | 17.3 | 15.6 | 13.4 | 11.8 | 12.5 | 14.8 | 16.2 | 17.1 |
| 25 | 23.2 | 33.7 | 29.5 | 17.8 | 18.5 | 17.7 | 21.2 | 24.4 | 24.0 |
| 30 | 33.6 | 54.9 | 46.3 | 23.5 | 29.9 | 27.8 | 27.2 | 33.6 | 30.8 |

[3] Phenylisodecyl phosphite
[6] Ester wax (based on: montanic acid)
[7] Diglycidyl ether of bisphenol A (liquid epoxide)
[8] Solid heterocyclic epoxy resin (triglycidyl isocyanurate)
[9] 6-Amino-1,3-di-n-butyluracl
[10] 6-Amino-1,3-di-ethyl-thiouracil The stabiliser combination (II4 to II9) of glycidyl and aminouracil compound according to the invention is found to be superior.

TABLE II

Static heat test at 190° C. (rolled for 5 min at 170° C.)

| Mixture | III1 | III2 | III3 | III4 | III5 | III6 | III7 | III8 | III9 |
|---|---|---|---|---|---|---|---|---|---|
| Evipol SH 6030 (PVC K value 60) | 100 | 100 | 100 | 100 | 100 | 100 | 100 | 100 | 100 |
| CH 300[3] | 0.8 | 0.8 | 0.8 | 0.8 | 0.8 | 0.8 | 0.8 | 0.8 | 0.8 |
| Wax E[6] | 0.4 | 0.4 | 0.4 | 0.4 | 0.4 | 0.4 | 0.4 | 0.4 | 0.4 |
| Epox. soya oil | 5.0 | 5.0 | 5.0 | 5.0 | 5.0 | 5.0 | 5.0 | 5.0 | 5.0 |
| Rhodiastab 50[11] | 0.2 | 0.2 | 0.2 | 0.2 | 0.2 | 0.2 | 0.2 | 0.2 | 0.2 |
| Ca stearate | 0.3 | 0.3 | 0.3 | 0.3 | 0.3 | 0.3 | 0.3 | 0.3 | 0.3 |
| Zn stearate | 0.5 | 0.5 | 0.5 | 0.5 | 0.5 | 0.5 | 0.5 | 0.5 | 0.5 |
| DASC[12] | / | / | / | 1.0 | 1.0 | 1.0 | / | / | / |
| Alkamizer I[13] | / | / | / | / | / | / | 1.0 | 1.0 | 1.0 |
| Stabiliser 1[5] | / | / | / | 1.0 | / | / | 1.0 | / | / |
| Stabiliser 2[9] | / | 1.0 | / | / | 1.0 | / | / | 1.0 | / |
| Stabiliser 3[10] | / | / | 1.0 | / | / | 1.0 | / | / | 1.0 |
| Minutes | YI | YI | YI | YI | YI | YI | YI | YI | YI |
| 20 | 15.2 | 22.7 | 37.4 | 12.9 | 10.6 | 16.1 | 10.0 | 10.2 | 12.4 |
| 25 | 31.4 | 66.9 |  | 20.6 | 22.5 | 26.5 | 16.3 | 17.0 | 18.8 |
| 30 | 57.2 |  |  | 34.0 | 49.1 | 41.8 | 24.1 | 29.7 | 26.5 |

[11] Stearoyl-benzoyl-methane supplied by RHONE-POULENC
[12] Dihydroxyaluminium sodium carbonate (DASC)
[13] Hydrotalcite supplied by KYOWA (Japan)

The addition of dawsonite and the addition of hydrotalcite both increase the stability.

TABLE IV

Static heat test at 190° C. (rolled for 5 min at 170° C.)

| Mixture | IV1 | IV2 | IV3 | IV4 | IV5 | IV6 | IV7 | IV8 | IV9 | IV10 | IV11 | IV12 |
|---|---|---|---|---|---|---|---|---|---|---|---|---|
| Evipol 5H 6030 (PVC K value 60) | 100 | 100 | 100 | 100 | 100 | 100 | 100 | 100 | 100 | 100 | 100 | 100 |
| CH 300[3] | 0.8 | 0.8 | 0.8 | 0.8 | 0.8 | 0.8 | 0.8 | 0.8 | 0.8 | 0.8 | 0.8 | 0.8 |
| Wax E[6] | 0.4 | 0.4 | 0.4 | 0.4 | 0.4 | 0.4 | 0.4 | 0.4 | 0.4 | 0.4 | 0.4 | 0.4 |
| Epox. soya oil | 2.0 | 2.0 | 2.0 | 2.0 | 2.0 | 2.0 | 2.0 | 2.0 | 2.0 | 2.0 | 2.0 | 2.0 |
| Rhodiastab 50[11] | 0.2 | 0.2 | 0.2 | 0.2 | 0.2 | 0.2 | 0.2 | 0.2 | 0.2 | 0.2 | 0.2 | 0.2 |

TABLE IV-continued

Static heat test at 190° C. (rolled for 5 min at 170° C.)

| Mixture | IV1 | IV2 | IV3 | IV4 | IV5 | IV6 | IV7 | IV8 | IV9 | IV10 | IV11 | IV12 |
|---|---|---|---|---|---|---|---|---|---|---|---|---|
| Chimassorb 944[14] | / | / | / | 0.15 | 0.15 | 0.15/ | / | / | / | / | / | |
| Malbit CR (maltite) | / | / | / | / | / | / | 0.5 | 0.5 | 0.5/ | / | / | |
| Dipentaerythritol | / | / | / | / | / | / | / | / | / | 0.5 | 0.5 | 0.5 |
| Stabiliser 1[5] | 1.0 | / | / | 1.0 | / | / | 1.0 | / | / | 1.0 | / | / |
| Stabiliser 2[9] | / | 1.0 | / | / | 1.0 | / | / | 1.0 | / | / | 1.0 | / |
| Stabiliser 3[19] | / | / | 1.0 | / | / | 1.0 | / | / | 1.0 | / | / | 1.0 |
| | YI | YI | YI | YI | YI | YI | YI | YI | YI | YI | YI | YI |
| Minutes | | | | | | | | | | | | |
| 10 | 6.0 | 6.6 | 10.3 | 6.6 | 5.8 | 9.0 | 5.8 | 6.2 | 8.1 | 5.4 | 5.8 | 10.0 |
| 15 | 10.1 | 12.7 | 18.7 | 7.8 | 7.7 | 11.1 | 7.3 | 7.2 | 10.4 | 6.7 | 9.9 | 11.2 |
| 20 | 24.2 | 29.5 | 47.9 | 13.8 | 10.6 | 15.4 | 8.9 | 9.4 | 11.1 | 11.7 | 20.1 | 15.7 |
| 25 | 59.9 | >70 | >60 | 29.1 | 32.1 | 24.8 | 11.1 | 19.5 | 16.1 | 21.9 | 48.0 | 25.2 |

[14] sterically hindered amine supplied by CLBA-GEIGY AG (HALS)

The stabiliser combinations according to the invention (IV4 to IV12) are found to give improved stabiliser activity.

TABLE V

Static heat test at 190° C. (rolled for 5 min at 170° C.)

| Mixture | V1 | V2 | V3 | V4 | V5 | V6 | V7 | V8 | V9 |
|---|---|---|---|---|---|---|---|---|---|
| Evipol SH 6030 (PVC K value 60) | 100 | 100 | 100 | 100 | 100 | 100 | 100 | 100 | 100 |
| CH 300[3] | 0.8 | 0.8 | 0.8 | 0.8 | 0.8 | 0.8 | 0.8 | 0.8 | 0.8 |
| Wax E[6] | 0.4 | 0.4 | 0.4 | 0.4 | 0.4 | 0.4 | 0.4 | 0.4 | 0.4 |
| Epox. soya oil | 2.0 | 2.0 | 2.0 | 2.0 | 2.0 | 2.0 | 2.0 | 2.0 | 2.0 |
| Rhodiastab 50[11] | 0.2 | 0.2 | 0.2 | 0.2 | 0.2 | 0.2 | 0.2 | 0.2 | 0.2 |
| Ca stearate | 0.3 | 0.3 | 0.3 | 0.3 | 0.3 | 0.3 | 0.3 | 0.3 | 0.3 |
| Zn stearate | 0.5 | 0.5 | 0.5 | 0.5 | 0.5 | 0.5 | 0.5 | 0.5 | 0.5 |
| Wessalite P[15] | / | / | / | 1.0 | 1.0 | 1.0 | / | / | / |
| Zeolite P[16] | / | / | / | / | / | / | 1.0 | 1.0 | 1.0 |
| Sfabiliser 1[5] | 1.0 | / | / | 1.0 | / | / | 1.0 | / | / |
| Stabiliser 2[9] | / | 1.0 | / | / | 1.0 | / | / | 1.0 | / |
| Stabiliser 3[10] | / | / | 1.0 | / | / | 1.0 | / | / | 1.0 |
| | YI | YI | YI | YI | YI | YI | YI | YI | YI |
| Minutes | | | | | | | | | |
| 20 | 10.3 | 12.3 | 15.4 | 8.8 | 10.6 | 14.2 | 9.3 | 9.4 | 15.7 |
| 25 | 19.6 | 34.7 | 28.6 | 12.4 | 16.8 | 19.5 | 13.3 | 15.3 | 22.6 |
| 30 | 41.1 | 29.5 | 58.8 | 21.0 | 32.5 | 30.5 | 25.0 | 29.2 | 34.8 |

[15] Na zeolite A supplied by DEGUSSA
[16] Na zeolite P supplied by DEGUSSA

The stabiliser combination comprising hydrotalcite and zeolites is found to give better results.

TABLE VI

Static heat test at 190° C. (rolled for 5 minutes at 170° C.)

| Mixture | VI1 | VI2 | VI3 | VI4 |
|---|---|---|---|---|
| Evipol EH 6030 (PVC K value 60) | 100 | 100 | 100 | 100 |
| Wax E[6] | 0.4 | 0.4 | 0.4 | 0.4 |
| CH 300[3] | 0.8 | 0.8 | 0.8 | 0.8 |
| Epox. soya oil | 5.0 | 5.0 | 5.0 | 5.0 |
| Ca stearate | 0.55 | 0.55 | 0.55 | 0.55 |
| Zn stearate | 0.25 | 0.25 | 0.25 | 0.25 |
| Rhodiastab 50[11] | / | / | 0.3 | 0.3 |
| D-26-155[17] | / | / | / | 0.3 |
| Stabiliser 1[5] | / | 1.0 | / | / |
| Stabiliser 2[9] | 1.0 | / | 1.0 | 1.0 |
| | YI | YI | YI | YI |
| Minutes | | | | |
| 20 | 18.5 | 9.7 | 11.4 | 15.6 |
| 25 | 36.5 | 18.8 | 21.9 | 28.3 |
| 30 | 103 | 33.3 | 46.0 | 59.2 |

[17] β-keto ester for the formula

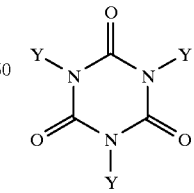

$Y = (CH_2)_2-O-CO-CH_2-CO-CH_3$

It can be seen that combinations comprising β-diketone or β-keto ester give results.

TABLE VII

Static heat test at 190° C. (rolled for 5 min at 170° C.)

| Mixture | VII1 | VII2 | VII3 | VII4 | VII5 | VII6 | VII7 | VII8 |
|---|---|---|---|---|---|---|---|---|
| Evipol 5H 6030 (PVC K value 60) | 100 | 100 | 100 | 100 | 100 | 100 | 100 | 100 |
| CH 300[3)] | 0.8 | 0.8 | 0.8 | 0.8 | 0.8 | 0.8 | 0.8 | 0.8 |
| Wax E[6)] | 0.4 | 0.4 | 0.4 | 0.4 | 0.4 | 0.4 | 0.4 | 0.4 |
| Epox. soya oil | 5.0 | 5.0 | 5.0 | 5.0 | 5.0 | 5.0 | 5.0 | 5.0 |
| Ca stearate | 0.55 | 0.55 | 0.55 | 0.55 | 0.55 | 0.55 | 0.55 | 0.55 |
| Zr stearate | 0.25 | 0.25 | 0.25 | 0.25 | 0.25 | 0.25 | 0.25 | 0.25 |
| Synesal M[18)] | / | / | / | 0.2 | 0.2 | / | / | |
| Stavinor b 507[19)] | / | / | / | / | / | 0.2 | 0.2 | |
| Stabiliser 1[5)] | 1.0 | / | / | 1.0 | / | 1.0 | / | |
| Stabiliser 2[9)] | / | 1.0 | / | / | 1.0 | / | 1.0 | |
| Stabiliser 3[10)] | / | 1.0 | / | / | / | / | / | |
| Minutes | YI | YI | YI | YI | YI | YI | YI | YI |
| 0 | 5.4 | 4.8 | 6.3 | 2.9 | 3.9 | 2.3 | 2.9 | 4.4 |
| 5 | 6.4 | 4.7 | 6.7 | 3.5 | 4.1 | 2.3 | 3.7 | 4.9 |
| 10 | 6.7 | 5.5 | 7.0 | 4.4 | 5.3 | 3.5 | 4.5 | 6.7 |
| 15 | 7.3 | 7.6 | 8.3 | 5.4 | 7.5 | 5.4 | 6.3 | 8.2 |
| 20 | 10.8 | 12.3 | 12.5 | 8.9 | 13.9 | 9.3 | 11.3 | 11.9 |
| 25 | 19.9 | 28.5 | 22.9 | 18.0 | 27.2 | 17.5 | 23.8 | 21.3 |
| 30 | 33.7 | 65.8 | 45.1 | 31.8 | 64.2 | 32.3 | 62.6 | 38.4 |

[18)]Thiodiethylene-bis(5-methoxy-carbonyl-2,6-dimethyl-1,4-dihydro-pyridine)-3-carboxylate supplied by LAGOR
[19)]3-bisdodecyloxycarbonyl-2,6-dimethyl-1,4-dihydropyridine supplied by ATOCHEM The test shows that stabiliser combinations comprising dihydropyridines (VII4 to VII8) have improved initial colour and colour maintenance (mean colour).

What is claimed is:

1. A stabiliser combination comprising
A) at least one compound of formula I

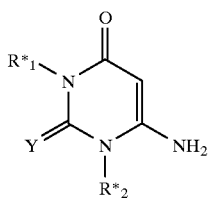

(I)

wherein $R^*_1$ and $R^*_2$ are each independently of the other $C_1$–$C_{12}$alkyl, $C_3$–$C_6$alkenyl, $C_5$–$C_8$cycloalkyl that is unsubstituted or substituted by from 1 to 3 $C_1$–$C_4$alkyl, $C_1$–$C_4$alkoxy, $C_5$–$C_8$cycloalkyl or by hydroxy groups or chlorine atoms, or $C_7$–$C_9$phenylalkyl that is unsubstituted or substituted at the phenyl ring by from 1 to 3 $C_1$–$C_4$alkyl, $C_1$–$C_4$alkoxy, $C_5$–$C_8$cycloalkyl or by hydroxy groups or chlorine atoms, and $R^*_1$ and $R^*_2$ may additionally be hydrogen and $C_1$–$C_{12}$alkyl, and Y is S or O, and B) at least one compound which is B8) hydrotalcites.

2. A stabiliser combination according to claim 1, wherein $R^*_1$ and $R^*_2$ are each independently of the other H and $C_1$–$C_4$alkyl or $C_1$–$C_4$alkyl.

3. A stabiliser combination according to claim 1, wherein the compound of component A) is 6-amino-1,3-dimethyl-uracil, 6-amino-1,3-di-n-propyl-uracil, 6-amino-1,3-di-n-butyl-uracil, 6-amino-1,3-diethyl-thiouracil or 6-amino-1,3-di-n-butyl-thiouracil.

4. A stabiliser combination according to claim 1, which additionally comprises at least one epoxidised fatty acid ester.

5. A stabiliser combination according to claim 1, which additionally comprises zinc and/or alkali metal and/or alkaline earth metal carboxylates or aluminium carboxylates.

6. A stabiliser combination according to claim 1, which additionally comprises at least one further substance from the groups of the phosphites, antioxidants, beta-dicarbonyl compounds, plasticisers, fillers, glidants and pigments.

7. A stabiliser combination according to claim 6, wherein the filler is chalk.

8. A stabiliser combination according to claim 6, wherein the glidant is calcium stearate.

9. A stabiliser combination according to claim 6, wherein titanium dioxide is used as the pigment.

10. A composition comprising a chlorine-containing polymer and a stabiliser combination according to any one of claim 1.

11. A composition according to claim 10, wherein PVC is used as the chlorine-containing polymer.

12. A method of stabilising chlorine-containing polymers, which comprises incorporating into the chlorine-containing polymers a stabiliser combination according to any one of claim 1.

* * * * *

UNITED STATES PATENT AND TRADEMARK OFFICE
CERTIFICATE OF CORRECTION

Page 1 of 3

PATENT NO. : 5,925,696
DATED : July 20, 1999
INVENTOR(S) : Wolfgang Wehner, et al.

It is certified that error appears in the above-identified patent and that said Letters Patent is hereby corrected as shown below:

Column 3, line 38: "2-ethylhexanol" should read --2-ethylhexanol--.

Column 3, line 67: "triand" should read --tri-and--

Column 5, line 13: "P'$_1$" should read --R'$_1$--

Column 5, line 21: "R' 2" should read --R'$_2$--

Column 9, line 67: "6pentamenethylpiperidin" should read --6-pentamethylpiperidin--

Column 12, line 34: "5dioxaspiro" should read --5-dioxaspiro--

Column 13, line 35: "2butenyl" should read --2-butenyl--

Column 14, line 2: "2" should read --2- --

Column 15, line 45: "O$^{13}$" should read --OR$^{13}$--

Column 15, line 66: "R$_{12}$" should read --R$^{12}$--

Column 27, line 39: "CH$_2$" should read --CH$^3$--

Column 43, line 35: "Table II" should read --Table III--

UNITED STATES PATENT AND TRADEMARK OFFICE
CERTIFICATE OF CORRECTION

PATENT NO. : 5,925,696
DATED : July 20, 1999
INVENTOR(S) : Wolfgang Wehner, et al.

It is certified that error appears in the above-identified patent and that said Letters Patent is hereby corrected as shown below:

Column 43, line 45: "/" should read --1.0--

Column 43, line 63: "Evipol 5H" should read --Evipol SH--

Column 45, line 5: "0.15/" should read --0.15--

Column 45, line 18: "CLBA" should read --CIBA--

Column 45, line 33: "Sfabilizer" should read --Stabiliser--

Column 46, line 5: " " should read --/--

Column 46, line 6: "0.5/" should read --0.5-- and " " should read --/--

Column 46, line 13: "Stavinor b" should read --Stavinor d--

Column 47, line 2: "give results" should read --give good results--

Column 47, line 6: "Evipol 5H" should read --Evipol SH--

UNITED STATES PATENT AND TRADEMARK OFFICE
CERTIFICATE OF CORRECTION

PATENT NO. : 5,925,696
DATED : July 20, 1999
INVENTOR(S) : Wolfgang Wehner, et al.

It is certified that error appears in the above-identified patent and that said Letters Patent is hereby corrected as shown below:

Column 47, line 16: "1.0" should read --/--

Column 47, line 16: "/" should read --1.0--

Column 48, line 13: " " should read --/--

Column 48, line 14: " " should read --0.2--.

Column 48, line 15: " " should read --/--

Column 48, line 16: " " should read --/--

Column 48, line 17: " " should read --/--

Column 48, line 52: "to anyone of" should read --to claim--

Column 48, lines 59 & 60: "to anyone of" should read --to claim--

Signed and Sealed this

Twenty-ninth Day of August, 2000

Attest:

Q. TODD DICKINSON

*Attesting Officer*      *Director of Patents and Trademarks*